United States Patent [19]

Krakauer

[11] E Patent Number: Re. 32,191

[45] Reissued Date of Patent: Jun. 24, 1986

[54] CONTROL SYSTEM FOR INCREASING THE VERSATILITY OF AN ALL PURPOSE MERCHANSIDER

[76] Inventor: Merrill Krakauer, 1 Deer Path, Short Hills, N.J. 07078

[21] Appl. No.: 712,545

[22] Filed: Mar. 15, 1985

Related U.S. Patent Documents

Reissue of:

[64] Patent No.: 4,391,388
Issued: Jul. 5, 1983
Appl. No.: 258,937
Filed: Apr. 30, 1981

[51] Int. Cl.[4] ..... G07F 11/54

[52] U.S. Cl. ..... 221/76; 221/113

[58] Field of Search ..... 221/76, 5, 13, 85, 84, 221/131, 124, 125, 126, 202, 242, 91, 129, 113, 130, 132, 133; 186/38, 49, 35, 52, 53; 194/2, 10

[56] References Cited

U.S. PATENT DOCUMENTS

| | | | |
|---|---|---|---|
| 2,773,580 | 12/1956 | Swede | 221/112 |
| 2,825,488 | 3/1958 | Nelson | 221/5 X |
| 2,982,592 | 7/1983 | Hebel | 221/76 |
| 3,075,670 | 1/1963 | Brügger | 221/76 |
| 3,147,838 | 9/1964 | Mueller et al. | 194/10 |
| 3,519,166 | 7/1970 | Yingst et al. | 221/13 |
| 3,765,566 | 10/1973 | Dasher | 221/129 |

*Primary Examiner*—Joseph J. Rolla
*Assistant Examiner*—David H. Bollinger
*Attorney, Agent, or Firm*—Shenier & O'Connor

[57] ABSTRACT

A merchandising machine of the type in which a merchandise carrier comprising a plurality of levels of compartments, each adapted to receive merchandise, is mounted within a cabinet for movement as a unit around a vertical axis with the compartment levels at heights corresponding to respective cabinet access openings closed by normally locked doors. Respective controls corresponding to the levels are adapted to be set alternatively to cause the levels to operate in a first-in, first-out mode or in a shopper mode. In the first-in, first-out mode, upon actuation of the selection button corresponding to the level, the carrier is driven until the next full compartment of the level is behind its associated door and then stops. In the shopper mode, the selecting button corresponding to the level causes the carrier to be driven until any desired compartment of that level is behind its associated door.

12 Claims, 19 Drawing Figures

CONTROL SYSTEM FOR INCREASING THE VERSATILITY OF AN ALL PURPOSE MERCHANSIDER

Matter enclosed in heavy brackets [ ] appears in the original patent but forms no part of this reissue specification; matter printed in italics indicates the additions made by reissue.

FIELD OF THE INVENTION

The invention relates to the field of all purpose merchandising machines, and more particularly to the field of a control system for such a machine which permits the machine to operate in a "first-in, first-out" mode without the necessity of individual drives for the various levels and which increases the versatility of the machine by permitting the levels thereof selectively to operate in the "shopper" mode or in the "first-in, first-out" mode.

BACKGROUND OF THE INVENTION

There are known in the prior art, merchandising machines which dispense a wide variety of articles having different shapes and sizes and varying shelf lives, such for example as sandwiches, food platters, milk and desserts. These machines are of two general types.

In one type of general merchandiser, which operates in the "first-in, first-out" mode, individual drives are provided for each level. Selecting means energizes the drives so as to step the selected level through one step while leaving the unselected levels at rest.

In a second type of general merchandiser, a carrier having a plurality of compartment levels associated with respective normally locked access doors is mounted for movement as a unit and is driven in response to actuation of a transport button selectively to position any compartment of the carrier behind its access door. This mode of operation is known as the "shopper" mode. A merchandiser of this type is disclosed in the application of Merrill Krakauer, Ser. No. 146,313, filed May 5, 1980, for All-Purpose Merchandiser, now U.S. Pat. No. 4,317,604 issued Mar. 2, 1982.

Both of the machines described above suffer from a number of disadvantages. While the "shopper" machines provide excellent merchandising appeal, the lack of control over the order in which products are sold results in a high order of "throw aways", as a result of spoilage. Merchandisers of the type described above which operate in a "first-in, first-out" mode, in which the customer is required to purchase the oldest product in the selected level, provide better control of loss of product. However, they require individual drives for the respective levels. Moreover, they do not afford merchandising appeal, owing to the limited choice offered to the customer.

It is clear that the "shopper" type merchandisers are desirable for vending a product with a relatively long shelf life and several different flavors or varieties, such for example as yogurt, while the "first-in, first-out" type merchandisers are desirable for vending products with a relatively short shelf life and fewer, if any, flavors or varieties, such for example as whole milk. A merchandiser, the operation of which is limited to one of the two modes, cannot efficiently dispense both long shelf life articles or articls of wide variety as well as short shelf life articles or articles of limited or no variety.

SUMMARY OF THE INVENTION

One object of the invention is to provide an improved control system for an all purpose merchandiser which overcomes the defects of control circuits of the prior art.

Still another object of the invention is to provide an improved control system for an all purpose merchandiser which renders the merchandiser more versatile than are all purpose merchandisers of the prior art.

A further object of the invention is to provide an improved control system for an all purpose merchandiser which permits each merchandise level to be operated in either the "first-in, first-out" or "shopper" mode of operation.

Yet another object of the invention is to provide a multi-level all purpose merchandiser which can operate in the "first-in, first-out" mode without requiring individual drives for the various levels.

Another object of the invention is to provide an improved control system for an all purpose merchandiser which is relatively inexpensive for the result achieved thereby.

Still another object of the invention is to provide an improved control system for an all purpose merchandiser which permits articles with varying shelf lives to be efficiently vended by one merchandiser.

Other and further objects of the invention will appear from the following description.

BRIEF DESCRIPTION OF THE DRAWINGS

In the accompanying drawings to which reference is made in the instant specification and which are to be read in conjunction therewith, and in which like parts are indicated by the same reference characters in the various views.

DESCRIPTION OF THE PREFERRED EMBODIMENT

Figure 1:
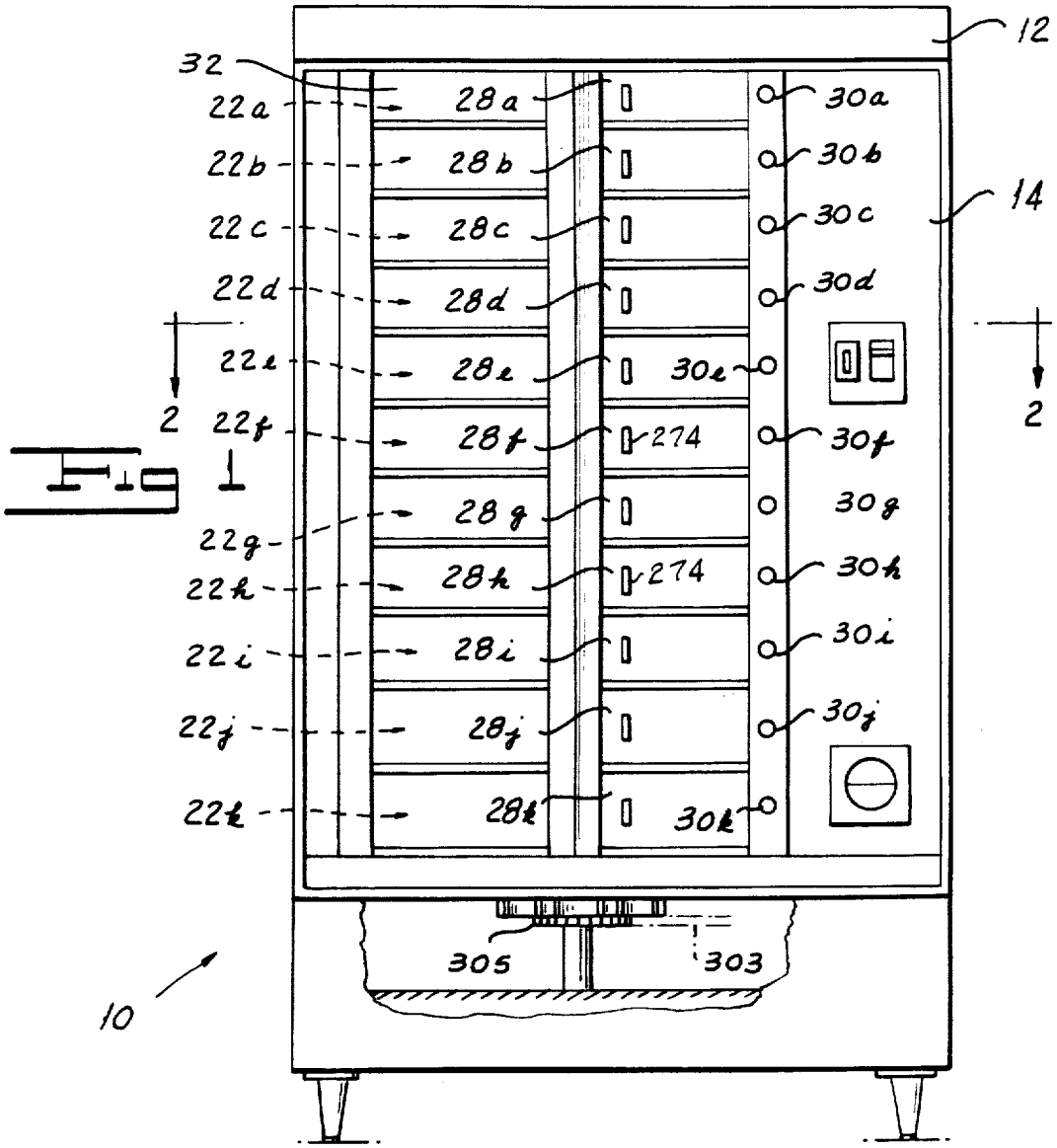
FIG. 1 is a front elevation of an all purpose merchandiser incorporating the improved control system.
Figure 2:
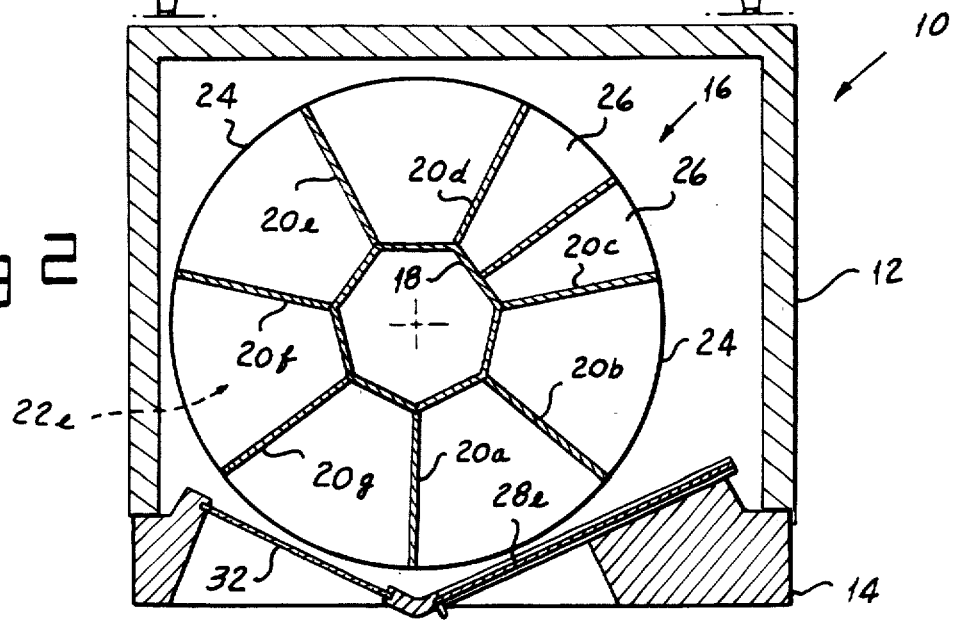
FIG. 2 is a sectional view of the all purpose merchandiser illustrated in FIG. 1, taken along the line 2—2 of FIG. 1.

Referring now to FIGS. 1 and 2 of the drawings, an all purpose merchandiser 10, more fully shown and described in the co-pending application referred to hereinabove, with which the improved control circuit 34 is adapted to be used, is provided with a cabinet 12 which supports a normally closed door 14. A merchandise carrier 16, positioned within the cabinet 12, includes a seven-sided column 18 to which are secured a plurality of vertically extending partitions 20a to 20g along the lines of intersection of the sides, thereby dividing the carrier 16 into seven sectors around the axis of the column. Column 18 is vertically divided into eleven merchandise-containing levels 22a through 22k by eleven trays 24 in each of the seven sectors, thereby providing seven merchandise compartments on each level. As described in the co-pending application, the capacity of each level may be doubled by dividing the space occupied by each tray 24 into two parts 26. Where one tray at any level is so divided, forming two smaller compartments 26, all trays on that level must be so divided.

The machine 10 supports the carrier 16 for rotary movement around the vertical axis of the column 18. A drive mechanism to be described in detail hereinbelow moves carrier 16 in steps which are equal to half the sector occupied by one of the trays 24. Transport buttons 30a to 30k, corresponding to the respective levels 22a through 22k, are adapted to be actuated to energize the motor to rotate the merchandise carrier 16 in a manner to be described.

The door 14 supports a number of merchandise compartment access doors 28a through 28k, corresponding to the respective levels 22a through 22k. Each door has a control mechanism which, when activated, permits sliding movement from a closed position to an open position to afford access to the merchandise compartment. On a level where each tray 24 is divided, the door control mechanism is adjusted to limit access to just one of the two smaller compartments. Cabinet door 14 supports a window 32, which extends vertically through the space occupied by all of the merchandise levels 22a through 22k to permit the articles to be viewed by a prospective customer.

Figure 5:
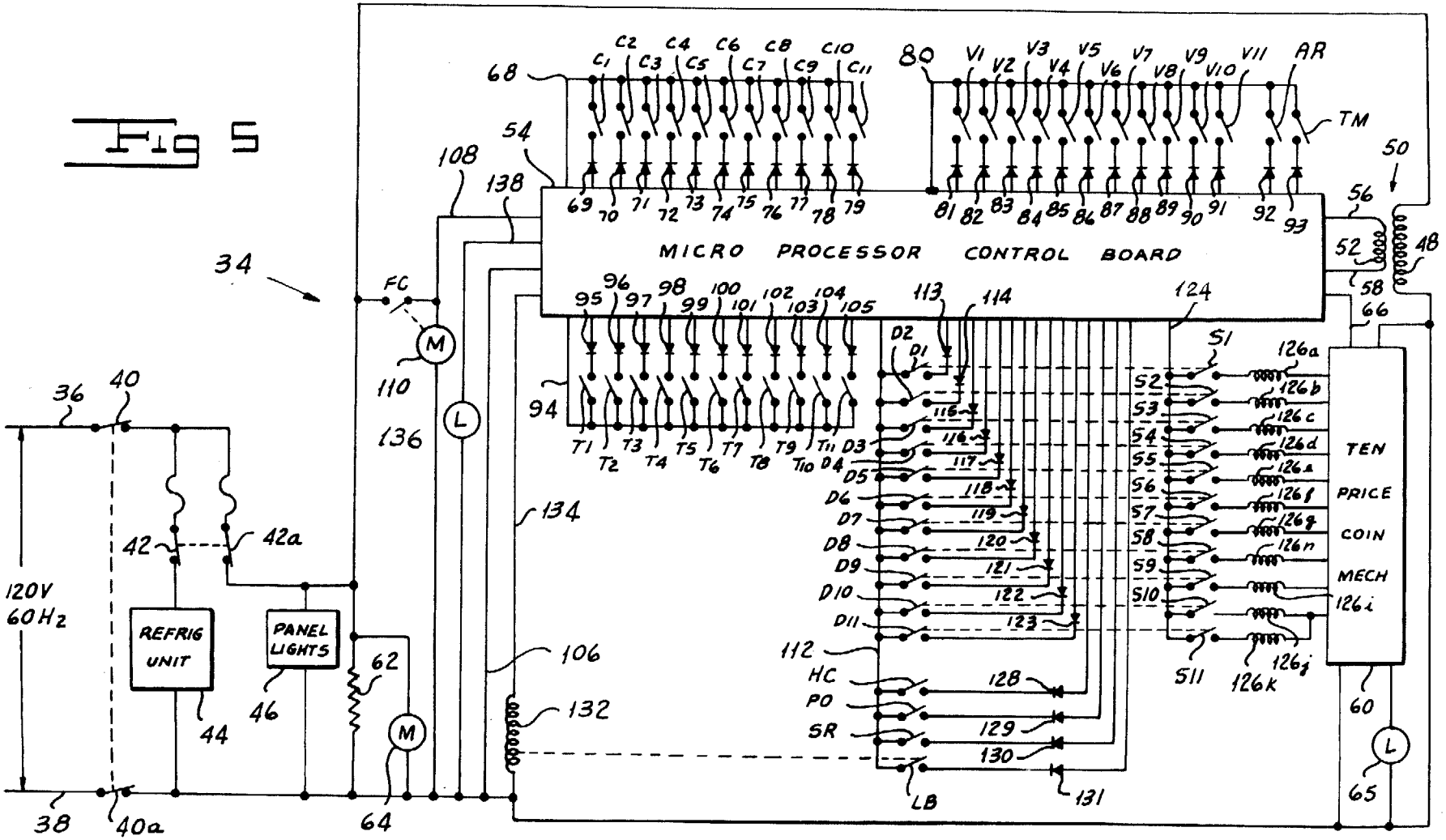
FIG. 5 is a schematic view of the improved control system for an all purpose merchandiser.

Referring now to FIG. 5, the improved control system for an all purpose merchandiser, indicated generally by the reference character 34, includes a source of voltage such, for example, as 120 v, 60 Hz having terminals 36 and 38, connected to the system by ganged switches 40 and 40a. A door interlock switch includes ganged arms, one arm 42 of which is adapted to energize the refrigeration unit 44 which cools the interior portion of the cabinet 12. The other door interlock switch 42a is adapted to provide power for the machine panel lights 46; for the primary winding 48 of a step-down control voltage transformer 50, the secondary winding 52 of which supplies power to the microprocessor 54 through conductors 56 and 58; for the coin mechanism 60; and for a 100 watt heater 62 and blower motor 64. The coin mechanism 60, which is of any suitable type known to the art, includes a "use exact change" lamp 65.

Conductor 68 connects one contact of each of a plurality of "compartment size switches" C1 through C11, corresponding to the respective levels 22a through 22k, to the microprocessor board 54. The other contacts of switches C1 through C11 are connected to the board through respective diodes 69 through 79, as more fully shown and described hereinbelow. The compartment size switches are located within the cabinet 12 and each switch is to be set by the service person in either the open position, if the corresponding level contains seven large merchandise compartments 24, or in the closed position, if the corresponding level has been modified to contain fourteen small compartments 26.

Conductor 80 connects one contact for each of a plurality of "vend mode switches" V1 through V11, corresponding to the respective levels 22a through 22k, to the microprocessor board 54. The other contacts of switches V1 to V11 are connected to the board through respective diodes 81 through 91, as more fully shown and described hereinbelow. The vend mode switches are located within the cabinet 12 and each switch is to be set by the service person in either the open position, if the corresponding level is to be operated in the "shopper mode", or in the closed position, if the corresponding level is to be operated in the "first-in, first-out mode" (FIFO). The shopper mode permits the customer to purchase any of the seven or fourteen products on that level. The FIFO mode limits the customer's purchase to the oldest product, or the product "first-in" on the selected level.

Conductor 80 also connects one contact of the automatic rotate switch AR and the transport made switch TM to the board 54. The other contacts of switches AR and TM are connected to the board through respective diodes 92 and 93, as more fully shown and described hereinbelow.

Both switches AR and TM are located within the cabinet 12 and are to be set by the service person. Closure of the auto rotate switch will cause the merchandise carrier 16 to rotate after the machine has been idle for 5 minutes, for example, to parade the supply of articles past window 32. In addition, it is contemplated that a commercial timer could replace the switch, disabling the automatic rotation during periods of inactivity. The setting of the transport more switch TM determines how the carrier will rotate in response to the actuation of one of the transport buttons 30a through 30k. If the switch TM is closed, the carrier will continue to rotate until the transport button is released. If the switch is open, the carrier will rotate until the next small product compartment is aligned with its delivery door.

Conductor 94 connects one contact of each of a number of "transport switches" T1 through T11, corresponding to the levels 22a through 22k, to the microprocessor board 54. The other contacts of switches T1 through T11 are connected to the board through respective diodes 95 through 105, as more fully shown and described hereinbelow. The transport switches are actuated by a prospective customer pressing the corresponding transport button 30a through 30k, located on the door 14. This causes the control system 54 to couple AC line 106 to line 108, energizing the transport motor 110 to rotate the merchandise carrier 16 in a manner to be described.

Conductor 112 connects one contact of each of a number of "door switches" D1 through D11, corresponding to respective doors 28a through 28k, to the microprocessor board 54. The other contacts of switches D1 through D11 are connected to the board through respective diodes 113 through 123, as more fully shown and described hereinbelow. Each door open switch D1 through D11 is located within the delivery door mechanism of its corresponding delivery door 28a through 28k, and is ganged to a corresponding "door solenoid switch" S1 through S11, also located within the door mechanisms. The door solenoid switches S1 through S11 connect conductor 124 to respective door open solenoids 126a through 126k.

Figure 3:
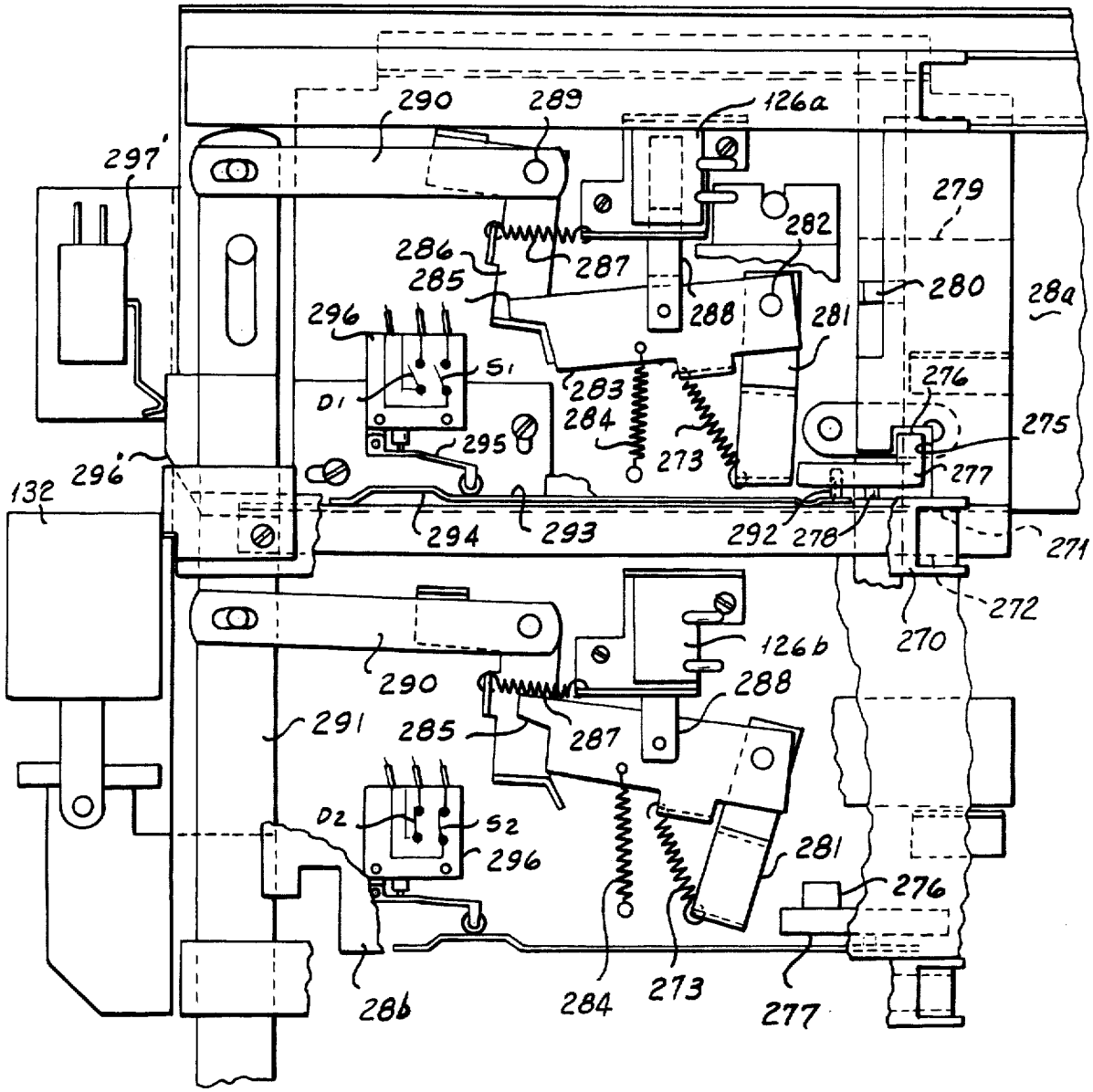
FIG. 3 is a fragmentary elevation of a portion of the machine shown in FIG. 1, illustrating the door operating mechanism.

Referring now to FIGS. 1 and 3, by way of example there are shown the two upper doors 28a and 28b and their associated control mechanisms with the parts of the upper door mechanism shown in the relative positions occupied thereby when the door is closed. The parts associated with door 28b are shown in the positions they occupy when the door is partially open. The cabinet door 14 supports a plurality of vertically spaced horizontally extending door guides 270, each of which is formed with an upper guide track 271 and a lower guide track 272. Moreover, each of the doors 28 is formed with a handle 274 which facilitates movement of the door by a customer. The inner corner of each door 28 is formed with a recess 275, which in the closed position of the door receives the upstanding lug 276 of a lock pawl 277 rotatable on a pivot shaft 278. The doors 28 normally are urged to closed position by constant force springs 279, one end of each of which is secured to the inner end of the door by any suitable means, such as a lug 280 and the other end of which is secured to a spool in a manner more fully described in the co-pending application. A pawl stop arm 281 supported on a pivot pin 282 normally is positioned in the path of a generally radially extending stop surface (not shown) on the pawl 277, so that the pawl cannot normally be moved by the door to a position at which the door is sufficiently open to permit the customer to gain access to the merchandise. Shaft 282 also supports a stop arm catch 283. A spring 273 connecting catch 283 and arm 281 urges these elements together to move as a unit. A spring 284 extending between the member 283 and a pin on the door 14 normally urges the members 283 and 281 to rotate as a unit in a counterclockwise direction as viewed in FIG. 5. Member 283 is formed with a nose 285, which normally rests on a bell crank arm flange of a bell crank 286 when the door is closed. A spring 287 normally urges the bell crank 286 to rotate in a counterclockwise direction around a pivot pin 289. Armature 288 of a solenoid 126 is connected to the member 283. When solenoid 126 is energized, it pivots latch 283 and stop arm 281 in a clockwise direction around the pin 282 to the position shown of the parts associated with door 28b in FIG. 3, in which position arm 281 is out of the path of movement of pawl 277, so that the door can be moved to its fully open position.

When the parts have been moved in a manner described hereinabove, to the position corresponding to the door release position, a second flange on the other arm of bell crank 286 comes to rest on the upper surface of a reset link 290 pivotally supported on pin 289. A reset bar 291 carries pins which are received in slots in the reset links 290. Bar 291 is supported for vertical reciprocating movement on the door 14 by means of pins and slots. A solenoid 132 is energized to move the bar 291 upwardly to pivot links 290 in a clockwise direction to rotate the bell crank to a position at which spring 284 can reset latch 283 and a stop arm 281. Each pawl 277 receives a pin 292 carried by a slide 293. Each slide 293 is provided with a boss 294. As a pawl 277 rotates in the course of opening movement of a door, the associated slide 293 moves to the right as viewed in FIG. 3 to cause the boss to move into engagement with the actuating arm 295 of a switch housing 296. It is to be noted that the movement of pawl 277 which causes the boss 294 to actuate the arm 295 is not sufficient to bring the pawl stop into engagement with the stop arm 281. The switch housing at each level houses the associated D and S switches which are concomitantly closed when arm 295 is actuated. For example, housing 296a contains ganged switches D1 and S1. As will be explained more fully hereinbelow, if at the time the boss 294a operates arm 295a to close switches D1 and S1, for example, sufficient money has been deposited in the machine to make a purchase, the associated solenoid 126a will be energized to move the stop 281a out of the path of pawl 277a to permit the door to be moved to its fully opened position. A cam 296 on the reset bar 291 operates a reset switch 297' when the reset operation takes place.

Referring again to FIG. 5, as has been explained hereinabove, each pair of switches D1/S1 through D11/S11 is actuated by the partial opening of the corresponding delivery door 28a through 28k by a customer. In this condition of the circuitry, interrogating pulses pass through the closed door-open switch, one of the switches D1 through D11, to the conductor 112, to inform the control system of an attempted vend. As will be explained more fully hereinbelow, if the proper conditions exist, the control system will couple AC line 106 to conductor 124, supplying power to the solenoid 126 of the partially open delivery door, through the associated closed door solenoid switch, one of the switches S1 through S11. If adequate coins have been deposited, the coin mechanism 60 completes the circuit, energizing the solenoid to free the delivery door for movement to the fully open position at which the compartment is accessible.

Figure 4:
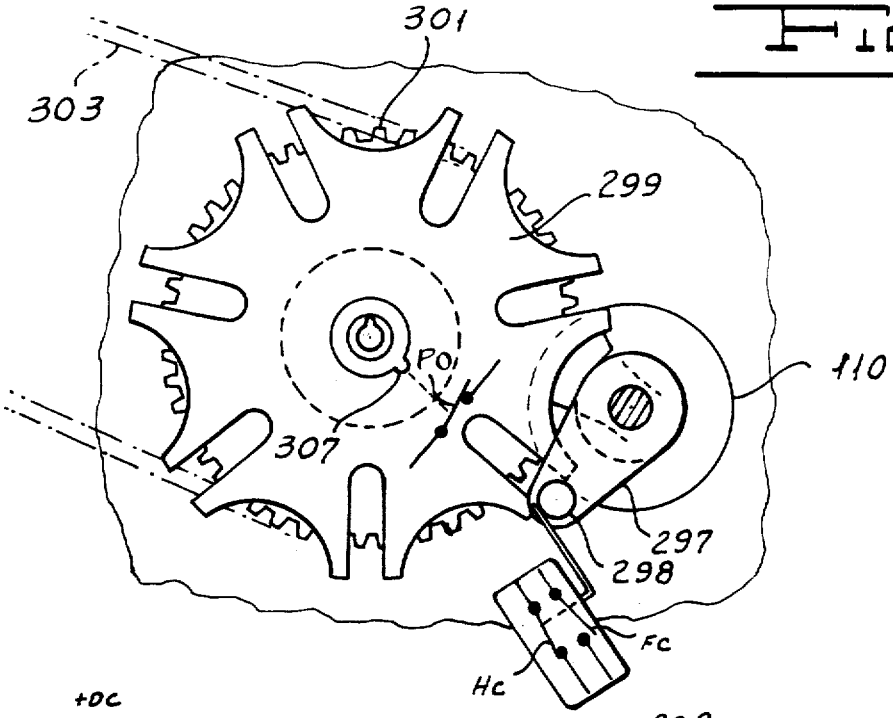
FIG. 4 is a fragmentary elevation of a part of the drive system of a machine with which the control system is used.

Referring now to FIGS. 1, 4 and 5, the compartment carrier drive system of the machine with which the control system is used includes motor 110 adapted to be momentarily energized from the a.c. lines 36 and 38 through conductor 108 when a transport switch T1 to T11 is actuated. Motor 110 drives a crank 297 carrying a pin 298 which drives a Geneva wheel 299 which drives a gear 301. Gear 301 drives a chain 303 which drives a gear 305 which rotates the compartment carrier. The arrangement is such that each revolution of motor 110 produces a one-seventh of a revolution of wheel 303 which produces one-fourteenth of a revolution or one compartment displacement of the merchandise carrier. As pin 298 leaves its home position shown in FIG. 4, a full cycle switch FC closes to complete the motor circuit for a full cycle. When pin 298 leaves its home position, a switch HC opens. This switch HC closes when the pin 298 returns to its home position to indicate that the merchandise carrier has stepped through half a compartment. A cam 307 which rotates with wheel 299 closes a "position zero" switch PO whenever the merchandise carrier is in its arbitrarily selected "home" position.

While I have shown and described a unidirectional drive system for rotating the merchandise carrier, it will readily be appreciated that a bidirectional drive could be provided and so controlled as to permit a selected compartment to be moved more quickly behind its associated door.

Referring again to FIG. 5, conductor 112 also connects one contact of the "Half Cycle" switch HC, the "Position One" switch PO, the "Service" switch SR and the "Lockbar" solenoid switch LB to the microprocessor board 54. The other contacts of switches HC, PO, SR and LB are connected to the board 54 through respective diodes 128, 129, 130 and 131, as will be more fully shown and described hereinbelow. The half-cycle switch HC closes each time the merchandise carrier completes one fourteenth of a revolution or each time a small compartment 26 is aligned with a delivery door, and the "position zero" switch PO is closed when the merchandise carrier 16 is in its home position. A position counter located within the control system is incremented each time the half-cycle switch closes and is set to zero each time the position zero switch closes in order to keep track of the position of the merchandise carrier. The service switch SR located within the cabinet 12, is closed by the service person in order to rotate the merchandise carrier 16 for reloading of the machine 10. The lockbar solenoid switch LB is closed each time the lockbar solenoid 132 is energized through conductor 134, indicating that all of the delivery doors 28a through 28k are locked in the closed position. As is more fully pointed out in the co-pending application, if any of the doors are not in the closed position, the control system will energize the "door open" lamp 136 through conductor 138.

Figure 6C:
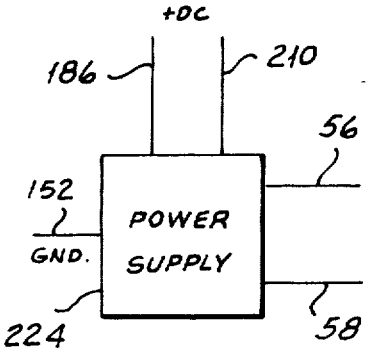
FIG. 6C is a schematic view of the power supply of the microprocessor shown in FIGS. 6A and 6B.
Figure 6A:
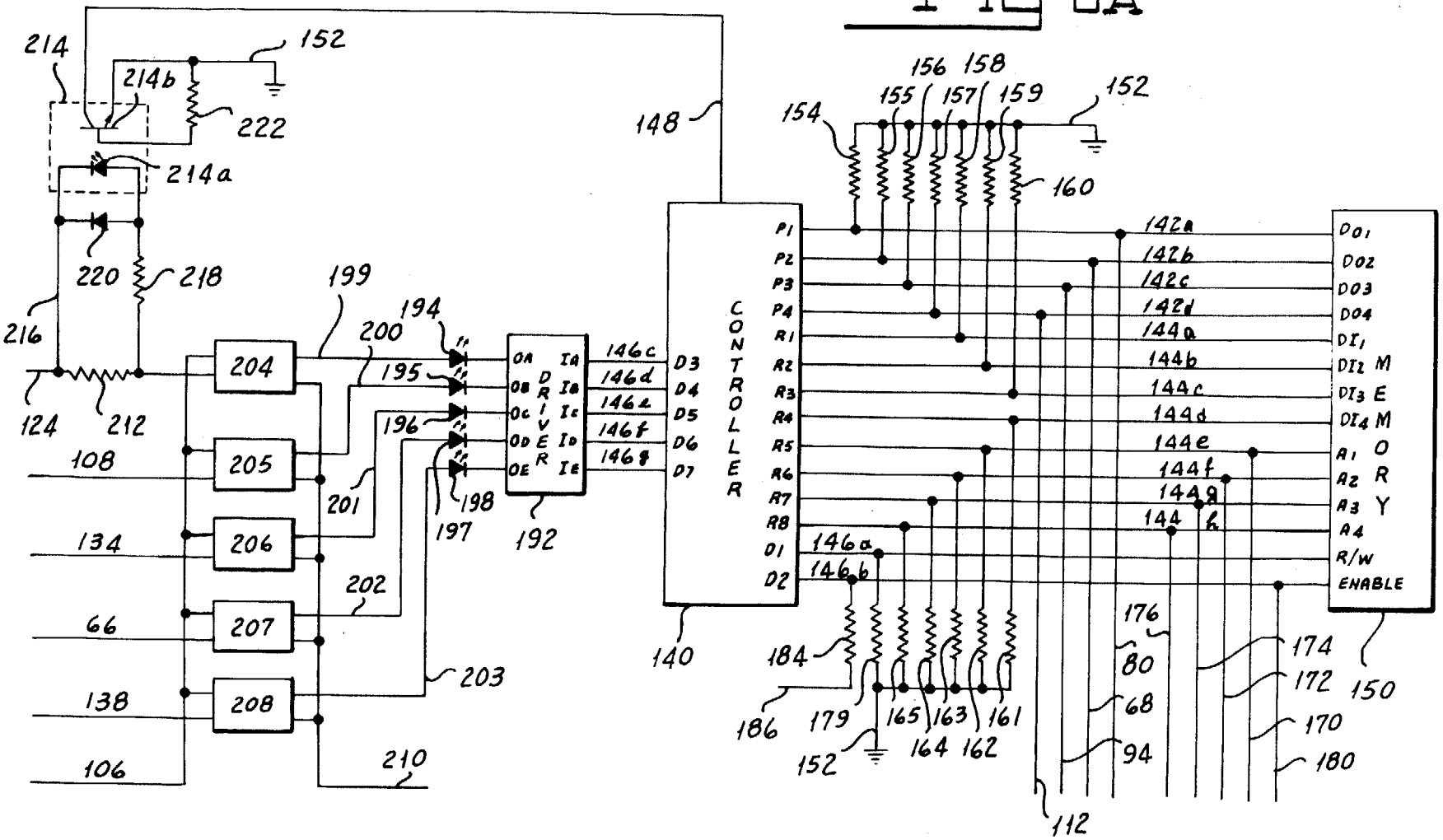
FIG. 6A is a schematic view of a portion of the microprocessor incorporated in the system shown in FIG. 5.
Figure 6B:
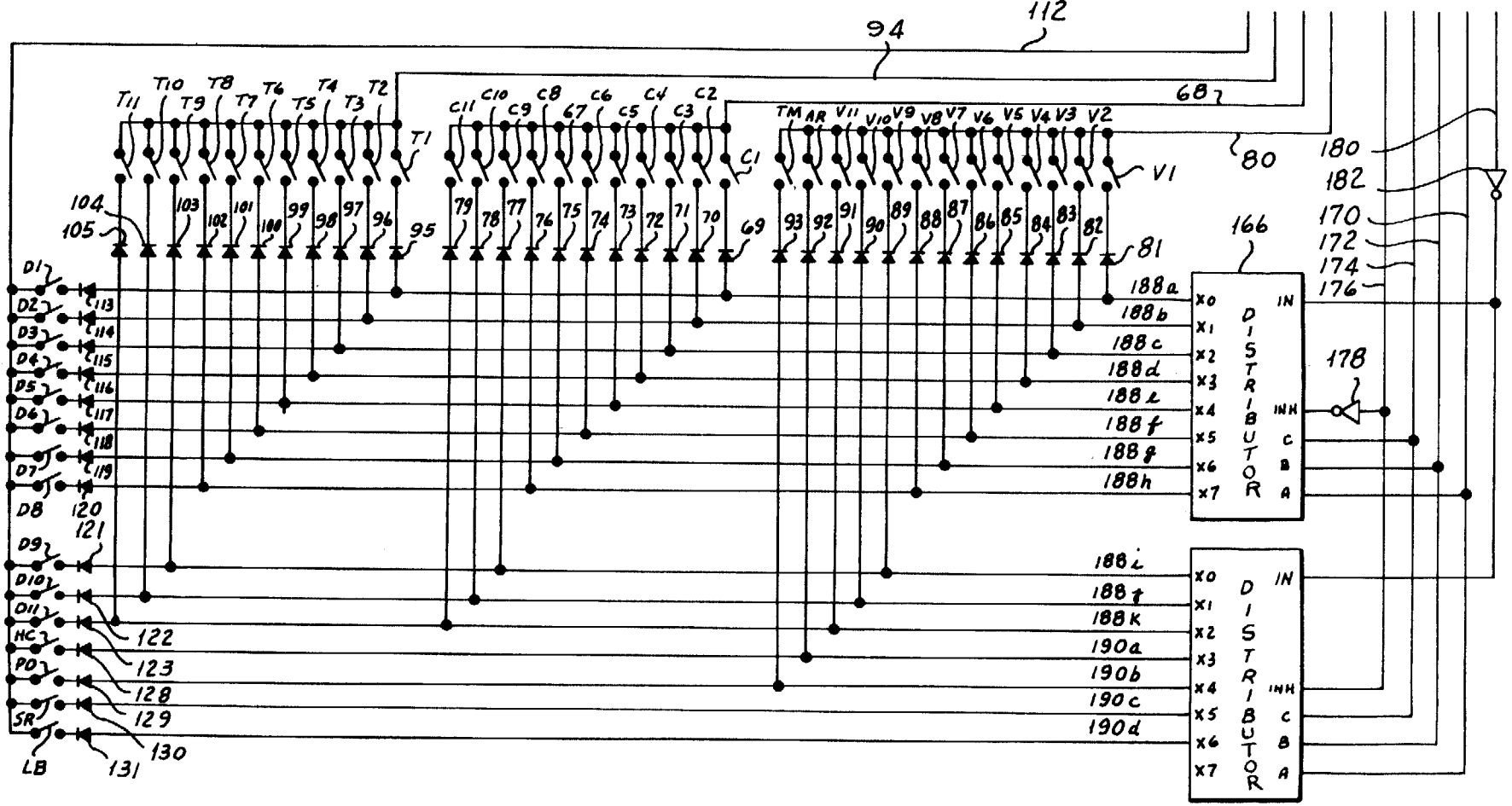
FIG. 6B is a schematic view of the remaining portion of the microprocessor incorporated in the system shown in FIG. 5.
Figure 9A:
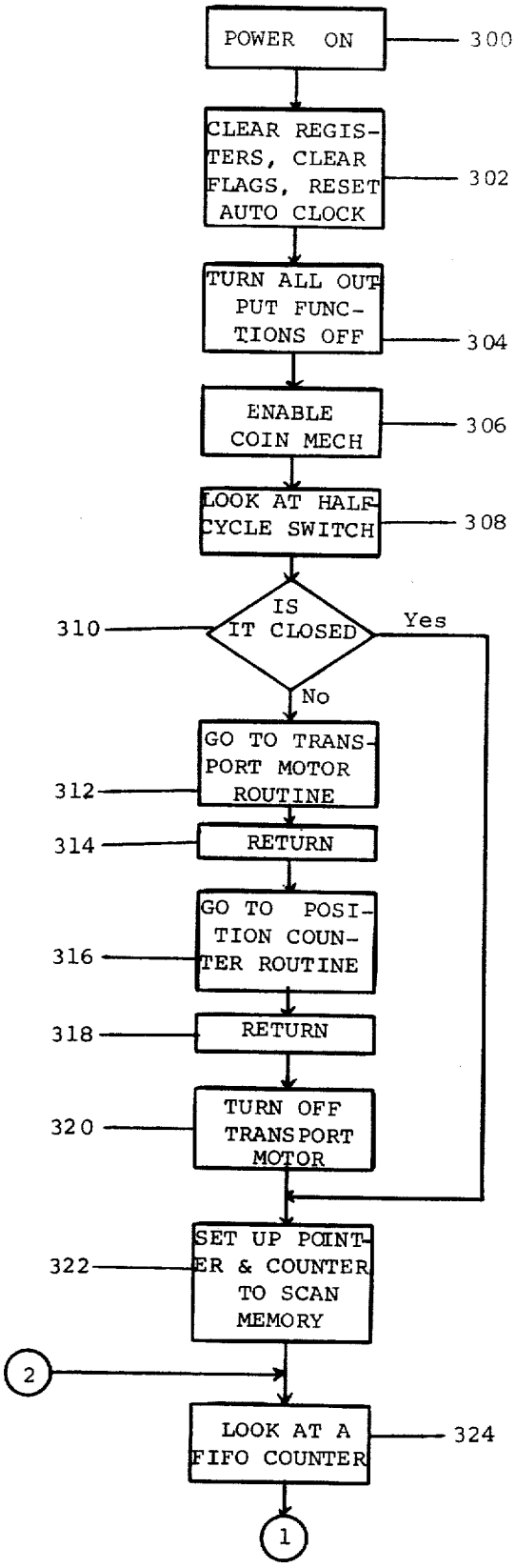
FIG. 9A is a flow chart of the initial part of the main program of the improved control system for an all purpose merchandiser.
Figure 9B:
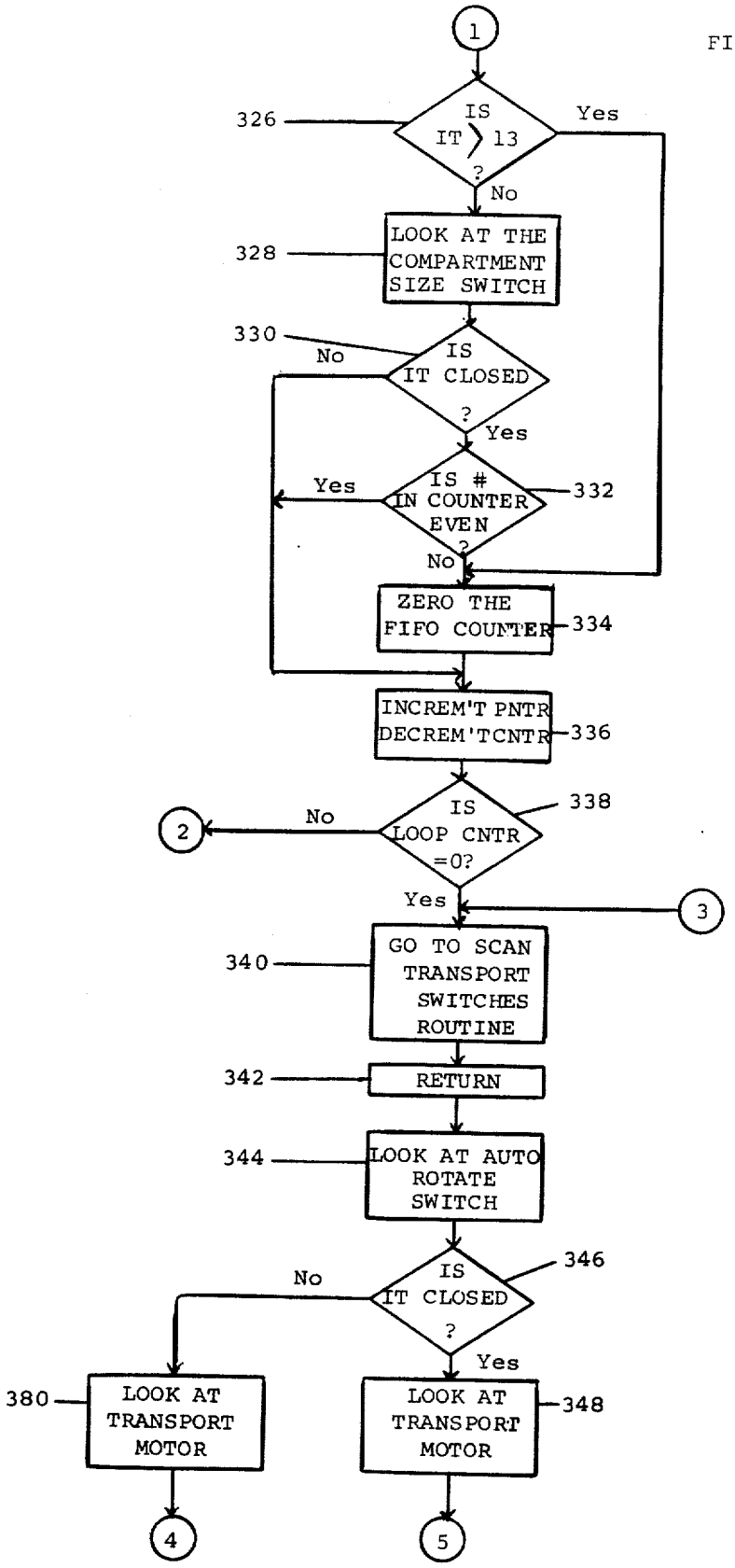
FIG. 9B is a continuation of the flow chart of FIG. 9A.
Figure 9C:
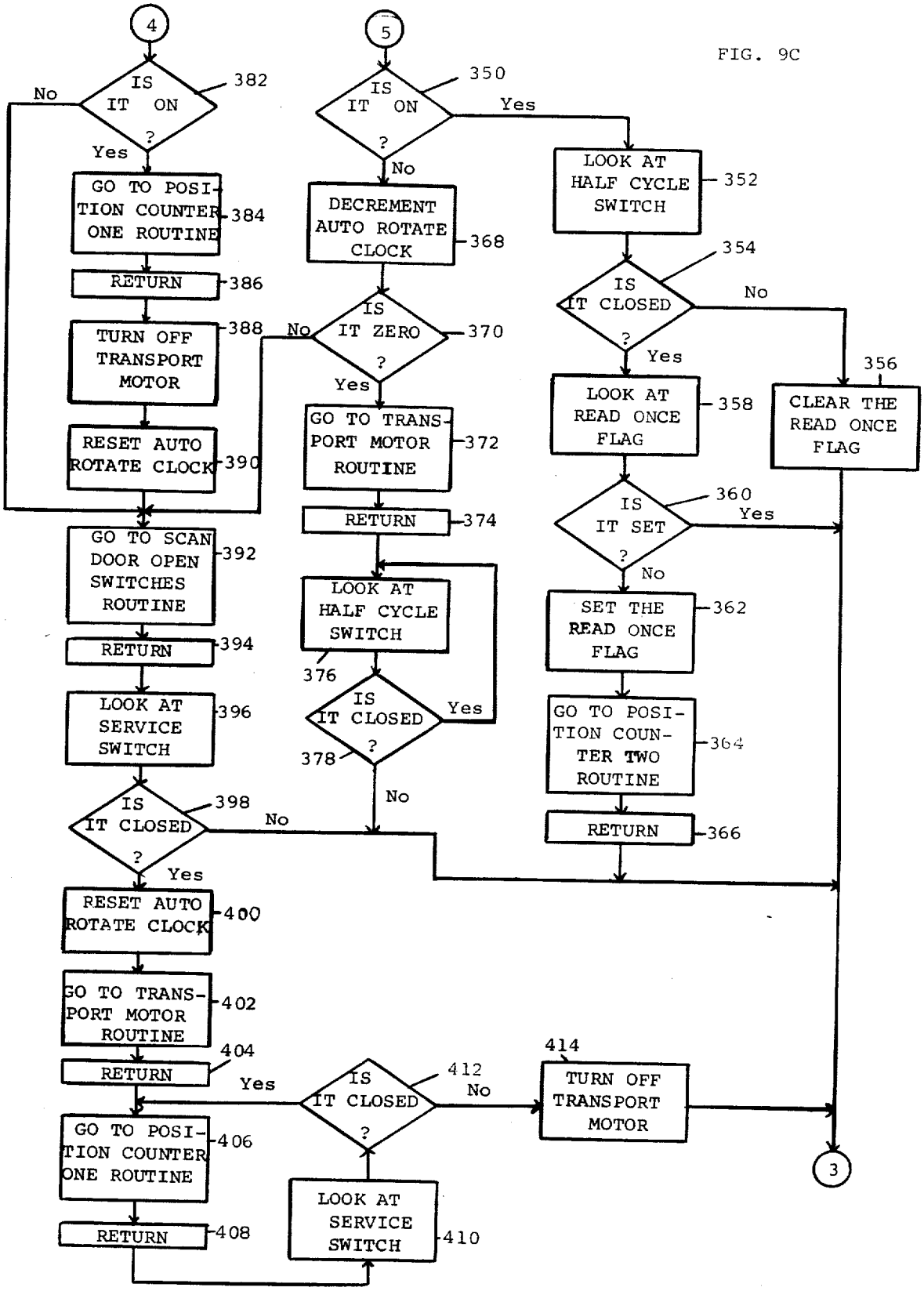
FIG. 9C is a flow chart of the terminal part of the main program of the improved control system for an all purpose merchandiser.

Referring now to FIGS. 6A to 6C, the microprocessor board indicated generally by the reference character 54 includes a controller 140 having a four-bit input port comprising pins P1 to P4, an eight-bit input-output port comprising Pins R1 to R8, a seven-bit input-output port comprising pins D1 to D7 and a one-bit "into" port. Of these pins, I couple pins P1 to P4 to lines 142a to 142d, pins R1 to R8 to lines 144a to 144h, pins D1 to D7 to lines 146a to 146g and "into" pin to line 148.

Lines 142a to 142d are connected to respective output pins DO1 to DO4 of a random access memory 150, and to respective conductors 80, 68, 94 and 112. It will be readily appreciated that lines 142a to 142d may receive an input from the four-bit output port DO1 to DO4 of the memory 150. In addition, when the memory is disabled, line 142a may receive an input through line 80 from one of the vend mode switches V1 to V11, the autorotate switch AR or the transport mode switch TM; line 142b may receive an input through line 68 from one of the compartment size switches C1 to C11; line 142c may receive an input through line 94 from one of the transport switches T1 to T11; and line 142d may receive an input through line 112 from one of the "door open" switches D1 to D11, the half-cycle switch HC, the "position one" switch PO, the "service" switch SR, or the "lockbar" switch LB. Respective resistors 154 to 157, connected between lines 142a to 142d and ground line 152 normally hold respective lives 142a to 142d and lines 80, 68, 94 and 112, connected thereto at logic zero.

Lines 144a to 144d provide inputs to the four-bit input port, comprising pins DI1 to DI4, of the memory 150. Respective resistors 158 to 161 connected between lines 144a to 144d and ground line 152 normally hold respective lines 144a to 144d at logic zero. Lines 144e to 144h provide inputs to the memory's four-bit address port, comprising pins A1 to A4. In addition, when the memory is disabled, lines 144e, 144f and 144g provide an input to the address ports, comprising pins A, B and C, of each of a pair of data distributors 166 and 168 through respective lines 170, 172 and 174. Line 144h, together with inverter 178, serves to enable one distributor while inhibiting the other, through line 176. Respective resistors 162 to 165, connected between lines 144e to 144h and ground line 152 normally hold respective lines 144e to 144h and lines 170, 172, 174 and 176, connected thereto at logic zero.

Lines 146a and 146b are connected to the "Read-Write" pin and the "Enable" pin respectively, of the memory 150. A low-level signal on line 146a places the memory in the "write" mode, while a high-level signal sets the memory in the "read" mode. Resistor 179, connected between the line 146a and ground line 152 normally holds line 146a at logic zero. Line 146b serves to enable and inhibit the memory 150 and also provides an input to distributors 166 and 168 through line 180 and inverter 182. A high level signal on line 146b enables the memory 150 and supplies a low-level input signal to the input pins of the distributors 166 and 168. Resistor 184, connected between lines 146b and ground line 186 normally holds the line 146b at logic zero.

Each of the data distributors 166 and 168 has an eight-bit output port comprising pins X0 to X7. A signal, on input pin IN of either distributor 166 or 168, may be routed to any one of the eight output pins X0 through X7 in response to the appropriate binary signal 000 through 111 on the address inputs A, B and C of the distributor. Output pins X0 through X7 of distributor 166 have respective lines 188a to 188h, while pins X0 through X2 of distributor 168 have respective lines 188i to 188k.

Lines 188a to 188k are associated respectively with the merchandise levels 22a to 22k. Each merchandise level line is connected to four switches which correspond to the level vend mode, the level compartment size, the level transport and the level "open door" condition. For example, output line 188d, associated with level 22d, is connected by a diode 84 to switch V4, the vend mode switch associated with level 22d. If the switch is closed, a signal placed on line 188d will appear on line 80 and 142a, informing the controller 140 that level 22d is to be operated in the first-in, first-out mode. An open switch will indicate that level 22d is to be operated in the shopper mode. Diode 72 connects line 188d to switch C4, the compartment size switch for level 22d. If the switch is closed, a signal placed on line 188d will appear on lines 68 and 142b, informing the controller 140 that level 22d contains seven large compartments, while an open switch will indicate 14 small compartments. Diode 98 connects line 188d with switch T4, the transport switch for level 22d. If the switch is closed, a signal placed on line 188d will appear on lines 94 and 142c, informing the controller 140 that a customer has pressed the transport button 30d associated with level 22d. Diode 116 connects 188d to switch D4, the door open switch for level 22d. If the switch is closed, a signal placed on line 188d will appear on lines 112 and 142d, informing the controller 140 that a vend is being attempted from level 22d.

Lines 190a through 190d are connected to respective output pins X3 through X6 of distributor 168. Line 190a is connected by diode 92 to the automatic rotate switch AR and by diode 128 to the half cycle HC. Line 190b is connected by diode 93 to the transport mode switch TM and by diode 129 to the position one switch PO. Line 190c is connected by diode 130 to the service switch SR and line 190d is connected by diode 131 to the lock-bar solenoid switch LB.

Lines 146c to 146g are connected to respective input pins $I_A$ to $I_E$ of an inverting driver 192 and respective output pins $O_A$ to $O_E$ to respective light emitting diodes (LED) 194 to 198, connected to lines 199 to 203, leading respectively to relays 204 to 208. A high-level signal or logic one, on any input pin $I_A$ to $I_E$ drives its corresponding output pin $O_A$ to $O_E$ to ground or logic zero, allowing current flow from the positive DC line 210 through the corresponding relay 204 to 208. In response to current flow, relay 204 couples a common AC line 106 to line 124, supplying power to the door open solenoids 126a to 126k; relay 205 couples line 106 to line 108, energizing the transport motor 110; relay 206 couples line 106 to line 134, energizing a lock-bar solenoid 132, locking delivery doors 28a to 28k in the closed position; relay 207 couples line 106 to line 66, resetting the coin mechanism 60; relay 208 couples line 106 to line 138, illuminating the "door open" lamp 136, LEDs 194 to 198 afford a visual indication of the relay or relays which are energized.

Relay 214 is a photon coupled isolator which includes an LED 214a and a phototransistor 214b. LED 214a is connected across resistor 212 through line 216 and resistor 218. A shunt diode 220 permits bi-directional current flow through resistor 218. The emitter terminal of the phototransistor 214b is coupled to ground line 152. A resistor 222 connects the base terminal of transistor 214b to ground line 152. Line 148 connects the collector terminal of transistor 214b to the "Into" pin of the controller 140. When a door solenoid 126a to 126k is energized, causing a voltage drop across resistor 212, phototransistor 214b is rendered conductive in response to light from diode 214a impinging on its base. This causes the transistor to couple line 148 to ground line 152, informing the controller 140 that an actual vend has taken place.

Referring now to FIG. 6C, a power supply 224 is adapted to provide the proper potentials for operating the logic unit of the system from a source of alternating current. More specifically, the supply 224 provides power for the controller 140, the memory 150, the driver 192 and the data distributors 166 and 168. In addition, the power supply maintains lines 186 and 210 at a positive DC potential and line 152 at ground.

Figure 7:
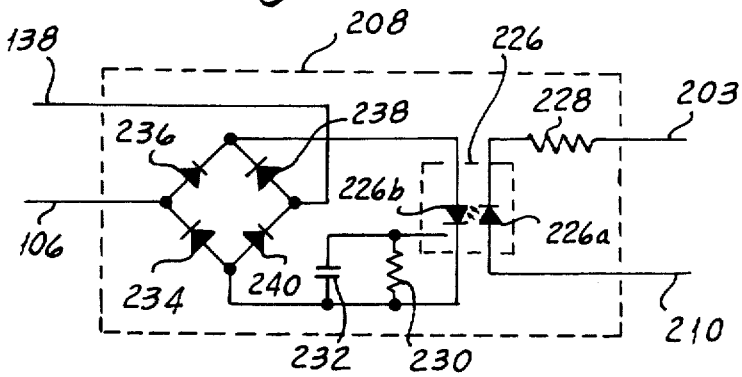
FIG. 7 is a schematic view of one of the electronic relays incorporated in the improved control system for an all purpose merchandiser.

Referring now to FIG. 7, relay circuit 208 includes a photon-coupled isolator 226 comprising an LED 226a connected in series with a resistor 228 between lines 210 and 203. A silicon controlled rectifier 226b having a gate resistor 230 and capacitor 232 is connected across one set of terminals of a full-wave rectifier made up of diodes 234, 236, 238 and 240. Normally, in the absence of current flow through and hence, photon emission from the diode 226a, the SCR 226b of isolator 226 remains non-conductive, preventing current flow through the full-wave rectifier. In response to current flow through the photon-emitting diode 226a, the SCR 226b becomes conductive, permitting current flow from line 106 through the rectifier bridge to line 138. Resistor 230 and capacitor 232 prevent noise from falsely triggering the isolator SCR 226b. Circuit 208 thus provides AC coupling between lines 106 and 138 in response to a low state on line 203 whenever line 210 carries a high potential.

Figure 8:
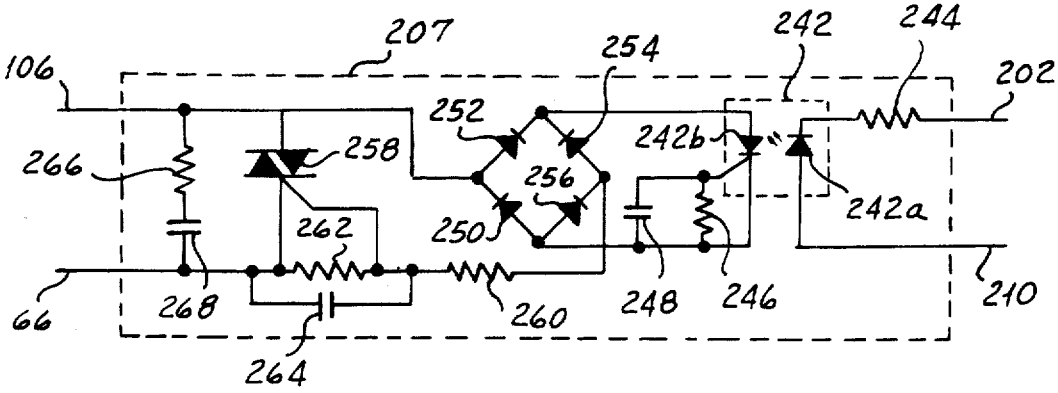
FIG. 8 is a schematic view of another of the electronic relays incorporated in the improved control system for an all purpose merchandiser.

Referring now to FIG. 8, relay circuit 207, to which circuits 204, 205, and 206 are identical, includes a photon coupled isolator 242 comprising an LED 242a connected in series with a resistor 244 between lines 210 and 202. We connect a silicon-controlled rectifier 242b having a gate resistor 246 and capacitor 248 across one set of terminals of a full-wave rectifier made up of diodes 250, 252, 254, and 256. Normally, in the absence of current flow-through and hence, photon emission from the diode 242a, the SCR 242b of isolator 242 remains non-conductive, preventing current flow through the full-wave rectifier. Under these conditions, a triac 258 coupled between lines 66 and 106 is non-conductive. In response to current flow through the photon-emitting diode 242a, the SCR 242b becomes conductive, permitting current flow from line 106 through the rectifier bridge and a resistor 260 to the gate of the triac 258, turning it on. Resistor 246 and capacitor 248 prevent noise from falsely triggering the isolator SCR 242b. Resistor 262 and shunt capacitor 264 prevent noise from falsely triggering the triac 258. The resistor 266 and capacitor 268 are connected in series between lines 106 and 66. Circuit 207 thus provides AC coupling between lines 106 and 66 in response to a low state on line 202 whenever line 210 carries a high potential.

The operation of the control system for an all-purpose merchandiser can best be understood by reference to FIGS. 9 to 13. Referring now to FIGS. 9a to 9c, the main program of my control system for an all-purpose merchandiser starts when power is supplied to the machine as indicated by block 300. The control circuit prepares for normal operation by clearing "pointer" and "loop counter" registers, setting "lock-bar" and "read once" flags or bits at zero and resetting the automatic rotate clock, all internal to the controller 140 (block 302). In addition, lines 146c through 146g are maintained at logic zero, disabling all output functions (block 304).

When power has reached its normal operating level, line 146f is raised to logic one, enabling the coin mechanism 60 (block 306). The half-cycle switch is then examined by placing a signal on line 190a while scanning line 142d (blocks 308 and 310). If the signal appears, the half-cycle switch is closed, indicating that the merchandise carrier 16 is properly aligned with the delivery doors, and the program continues to block 322. If, however, the switch is open, the program jumps to the "transport motor" routine which energizes the transport motor, causing the carrier to rotate (blocks 312 and 314), and then to the "position counter one" routine, which waits for the half-cycle switch to close before returning (blocks 316 and 318), as will be more fully explained hereinbelow. Line 146d is then brought to logic zero turning off the transport motor (block 320).

Associated with each of the eleven merchandise levels 22a to 22k is a four-bit first-in, first-out counter (FIFO) stored in a portion of the memory 150. Each FIFO counter contains a number indicating the location of the compartment containing the oldest product on its corresponding level. The number should be from zero to thirteen, corresponding to the maximum number of fourteen small compartments on a given level. In addition, FIFO counters for levels having seven large compartments should contain only even numbers. To determine whether the FIFO counters contain valid data, a loop counter, indicating the number of FIFO counters which remain to be checked is set to eleven and a pointer, indicating which FIFO counter is to be checked is set to one (block 322). The controller then examines a FIFO counter by placing the address signal indicated by the pointer on the memory's address lines 144e to 144h, setting the memory in the read mode by placing high-level signals on lines 146a and 146b, and scanning lines 142a to 142d (block 324). If the FIFO counter contains a number greater than thirteen, line 146a goes low, setting the memory in the "write" mode and a signal is placed on the memory's input lines 144a to 144d setting that counter to zero (blocks 326 and 334). If the FIFO counter contains a number less than thirteen, the compartment size switch C1 to C11 associated with that FIFO counter is checked by grounding line 142b, maintaining the chosen address signal on lines 144e to 144h, while scanning input line 142b (Blocks 328 and 330). The grounding of line 142b disables the memory and provides a high level input to the data distributors 166 and 168 through line 180 and inverter 182. Lines 144e through 144g provide an address input through lines 170, 172 and 174, and line 144h inhibits one distributor while enabling the other through line 176 and inverter 178. The signal is routed to the corresponding line (one of the lines 188a to 188k) while line 142b is scanned. If the signal fails to appear, the level contains fourteen small compartments and the program continues to block 336. If the signal appears, the level contains seven large compartments and the FIFO counter is further checked to see if it contains an even number (block 332). If not, the counter is set to zero (block 334). The loop counter is then decremented by one and the pointer incremented by one (block 336), and the program loops back to block 324 to check the next FIFO counter. When the loop counter has been decremented to zero, indicating that all the FIFO counters contain valid data, the program exits the loop created by blocks 324 to 338.

At this point, the program jumps to the "scan transport switches" routine, which activates the transport motor in response to the closure of a transport switch T1 to T11 in a manner to be more fully described hereinbelow, and then returns (blocks 340 and 342).

As indicated by blocks 344 and 346, the automatic rotate switch AR is examined by placing a signal on line 190a while scanning line 142a. If the switch is closed the signal will appear, indicating that the function, which serves to rotate the carrier after five minutes of inactivity, has been selected. If the carrier is already in rotation, indicated by a high signal on line 146d, it will become necessary to keep track of its position (blocks 348 and 350). To this end, the controller maintains the signal on line 190a while scanning line 142d to determine whether the half-cycle switch is closed (blocks 352 and 354). If the signal fails to appear a "read once" flag or bit is cleared and the program loops back to block 340 (block 356). If the signal appears and the read once" flag is set, the program loops back to block 340 (blocks 358 and 360). If the "read once" flag is clear, it is set (block 362) and the program jumps to the "position counter two" routine before looping back to block 340 (block 364 and 366).

The position counter one and position counter two routines serve to keep track of the position of the merchandise carrier by incrementing by one a "position counter" located within the memory 150, each time the half-cycle switch closes and setting it to zero each time the position one switch closes, as will be more fully described hereinbelow. The "read once" flag prevents the program from incrementing the position counter more than once for each half-cycle switch closure.

If the carrier is not rotating, indicated by a low signal on line 146d, the program will decrement an autorotate clock (blocks 350 and 368), which prevents the automatic rotate function from energizing the transport motor unit five minutes has expired. During this interval, the program jumps to block 392 (block 370). When the clock is decremented to zero, the program energizes the transport motor (blocks 372 and 374) causing the carrier to rotate. The program then waits in a loop comprising blocks 376 and 378 until the switch is open by the rotation of the carrier before looping back to block 340.

If the autorotate function has not been selected, blocks 348 through 378 are ignored and the program proceeds from block 346 directly to block 380, leading to block 382, which indicates the condition of the transport motor. If the merchandise carrier is not rotating, the program jumps to block 392. If the carrier is rotating, indicated by a high-level signal on ine 146d, the program will wait for the half-cycle switch to close (blocks 384 and 386) and then place a low-level signal on line 146d turning off the transport motor (block 388). The automatic rotate clock will then be re-set (block 390) and the program will continue to block 392.

At block 392 the program jumps to the "scan door-open switches" routine, which scans the door-open switches and supplies power to the door-open solenoids to permit a vend in a manner to be more fully described hereinbelow, and then returns (block 394). The service switch SR is then checked by placing a signal on line 190c while scanning line 142d (blocks 396 and 398). If the signal does not appear, the service switch is open and the program will loop back to block 340. If, however, the service switch is closed, the program will re-set the automatic rotate clock (block 400) and energize the transport motor (blocks 402 and 404). The program then enters the loop comprising blocks 406 through 412, where the position counter is incremented each time the half-cycle switch closes (blocks 406 and 408) and the carrier is allowed to rotate as long as the service switch is closed (blocks 410 and 412). Once the service switch is opened, the transport motor is turned off (block 414) and the program loops back to block 340.

Figure 10:
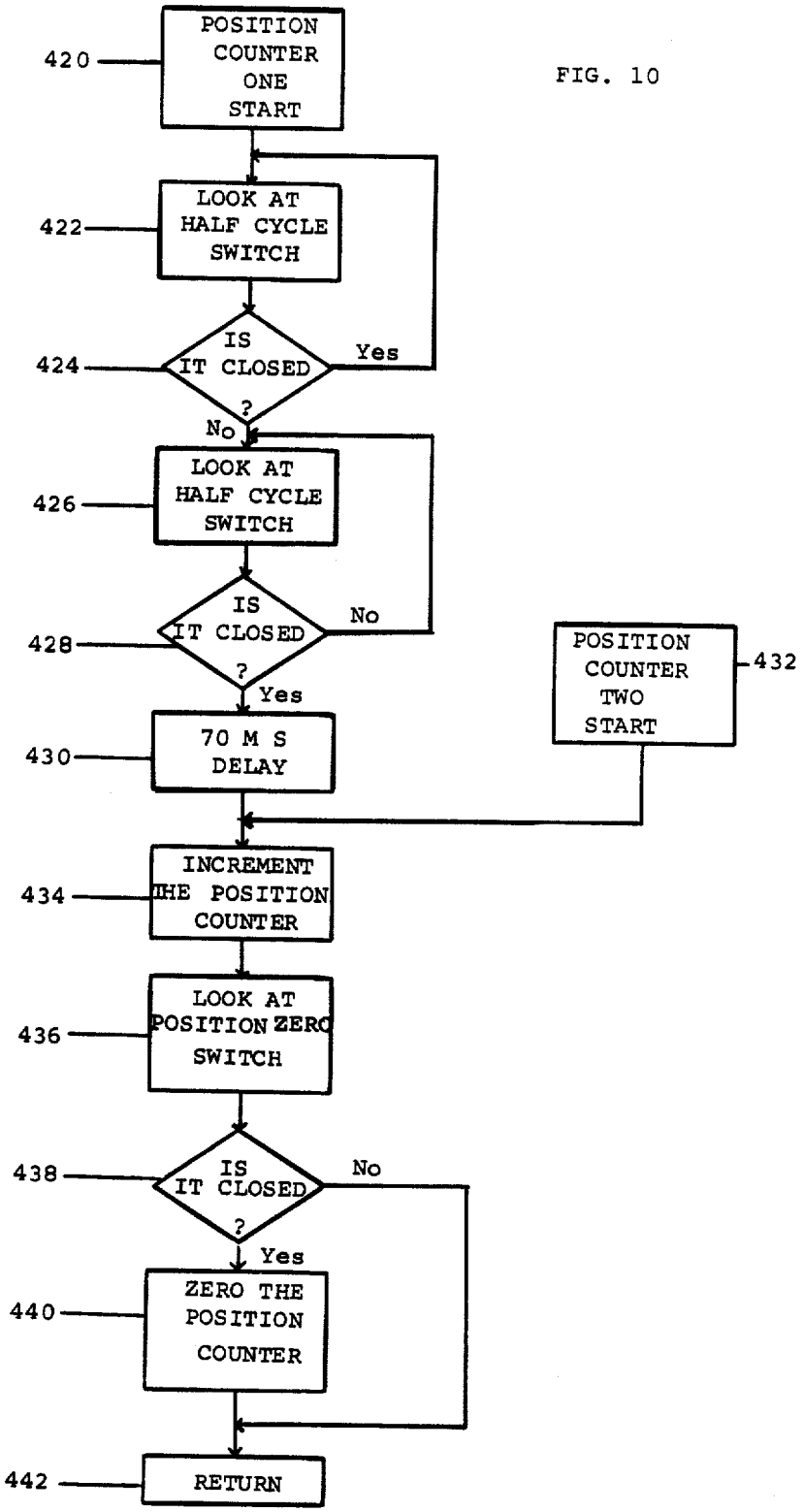
FIG. 10 is a flow chart of the "position counter one" and "position counter two" subroutines of the main program illustrated in FIGS. 9A to 9C.

Referring now to FIG. 10, there are shown the "position counter one" and the "position counter two" routines to which the program transfers whenever the carrier is in rotation, to keep track of its position. The position counter one routine begins at block 420 with the program entering the first of two loops comprising blocks 422 through 428. The program exits from the first loop (blocks 422 and 424) when the half-cycle switch is found to be open, and leaves the second loop (blocks 426 and 428) when the switch subsequently closes. This assures that the position counter is incremented only once for each half-cycle switch closure and that the position counter is zeroed only once each time the position one switch closes. The program then delays for 70 milliseconds (block 430), before incrementing the position counter by one (block 434). This is accomplished by placing a high-level signal on line 146b, enabling the memory and a low-level signal on line 146a, setting it in the "write" mode. Appropriate signals are then placed on the memory's address lines 144e to 144h and input lines 144a to 144d. The position one switch is then examined by placing a signal on line 190b while scanning line 142d (blocks 436 and 438). If the signal does not appear, the program leaves the routine and returns (block 442). If the signal does appear, the position counter is set to zero (block 440) before the program returns. The position counter two routine begins at blocks 432 and continues through blocks 434 to 442 as described above.

Figure 11:
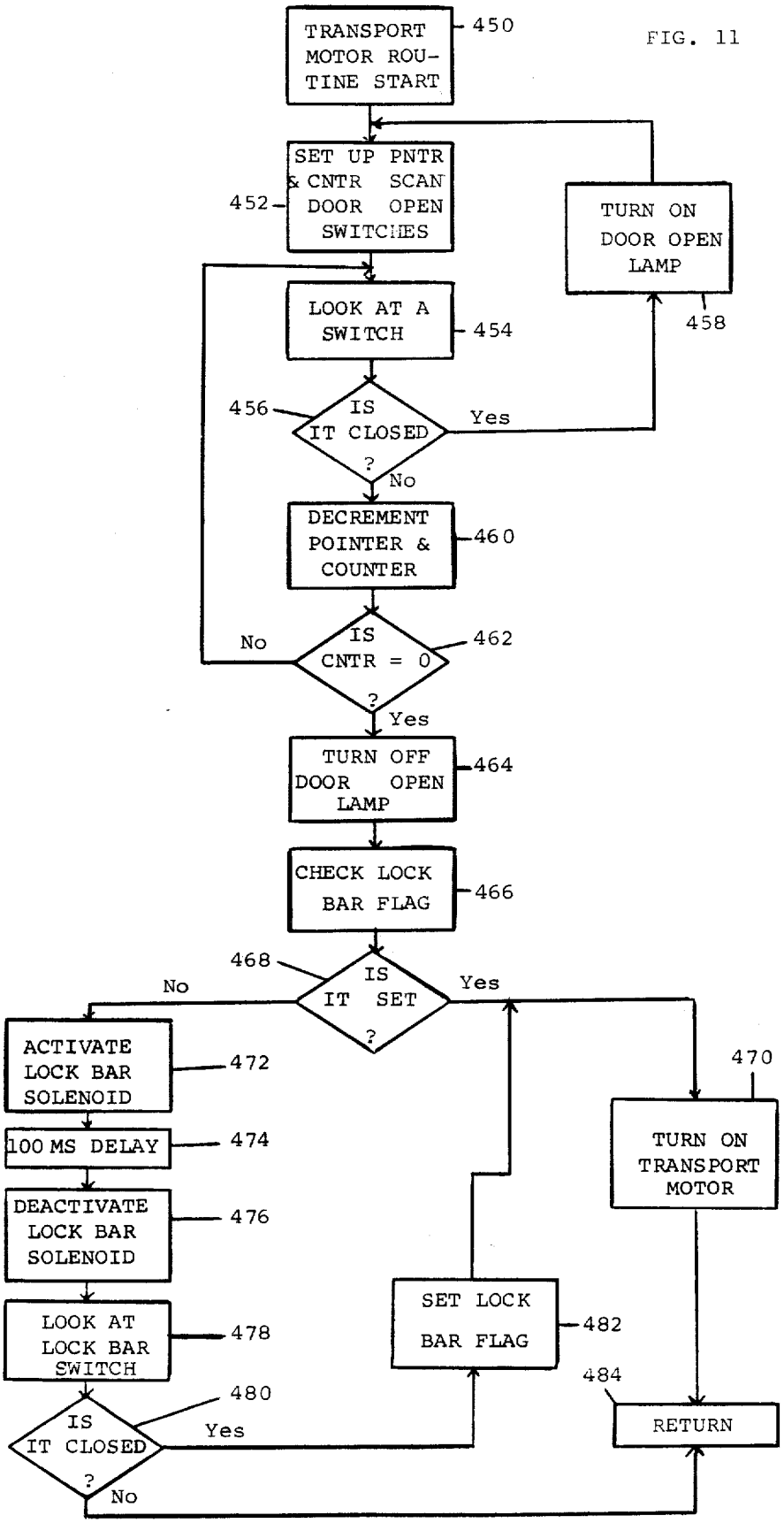
FIG. 11 is a flow chart of the "transport motor" subroutine of the main program illustrated in FIGS. 9A to 9C.

Referring now to FIG. 11, the "transport motor" routine which activates the transport motor causing the merchandise carrier to rotate begins at block 450. The program first checks if all the door open switches D1 through D11 are in the open position, indicating that all eleven delivery doors 28a through 28k are closed. To this end, a loop counter, indicating the number of switches which remain to be checked and a pointer, indicating which switch is to be checked, are both set to eleven (block 452). The program then examines a switch by placing a signal on the output line chosen by the pointer (one of the lines 188a to 188k) while scanning input line 142d (blocks 454 and 456). If no signal appears, the loop counter and pointer are both decremented by one (block 460) and the program loops back to block 454 to examine the next switch (block 462). When the loop counter has been decremented to zero, indicating that all the door-open switches are in the open position, the program continues to block 464. If, however, one of these switches is closed, line 146g is raised to logic one to illuminate the "door-open" lamp 136 (block 458), and the program waits in the loop formed by blocks 452 througgh 462 until all the delivery doors are closed, at which point line 146g goes low, turning off the lamp (block 464).

As indicated by blocks 466 and 468, the program determines whether the lock-bar flag or bit is set, indicating that the delivery doors are all locked in the closed position. If the flag is set (logic one) a high-level signal is placed on line 146d, activating the transport motor (block 470) and the program returns (block 484). On the other hand, if the lock-bar is clear (logic zero), a high-level signal is placed on line 146e to activate the lock-bar solenoid (block 472). The solenoid remains energized for 100 milliseconds before line 146e is grounded, deactivating it (blocks 474 and 476). The lock-bar switch LB, which is closed by the activation of the lock-bar solenoid is then checked by placing a signal on line 190d while scanning line 142d (blocks 478 and 480). If the signal appears, the lock-bar flag will be set (block 482), the transport motor will be energized (block 470) and the program will return (block 484). If no signal appears, the program will return, but the transport motor will not be energized.

Figure 12A:
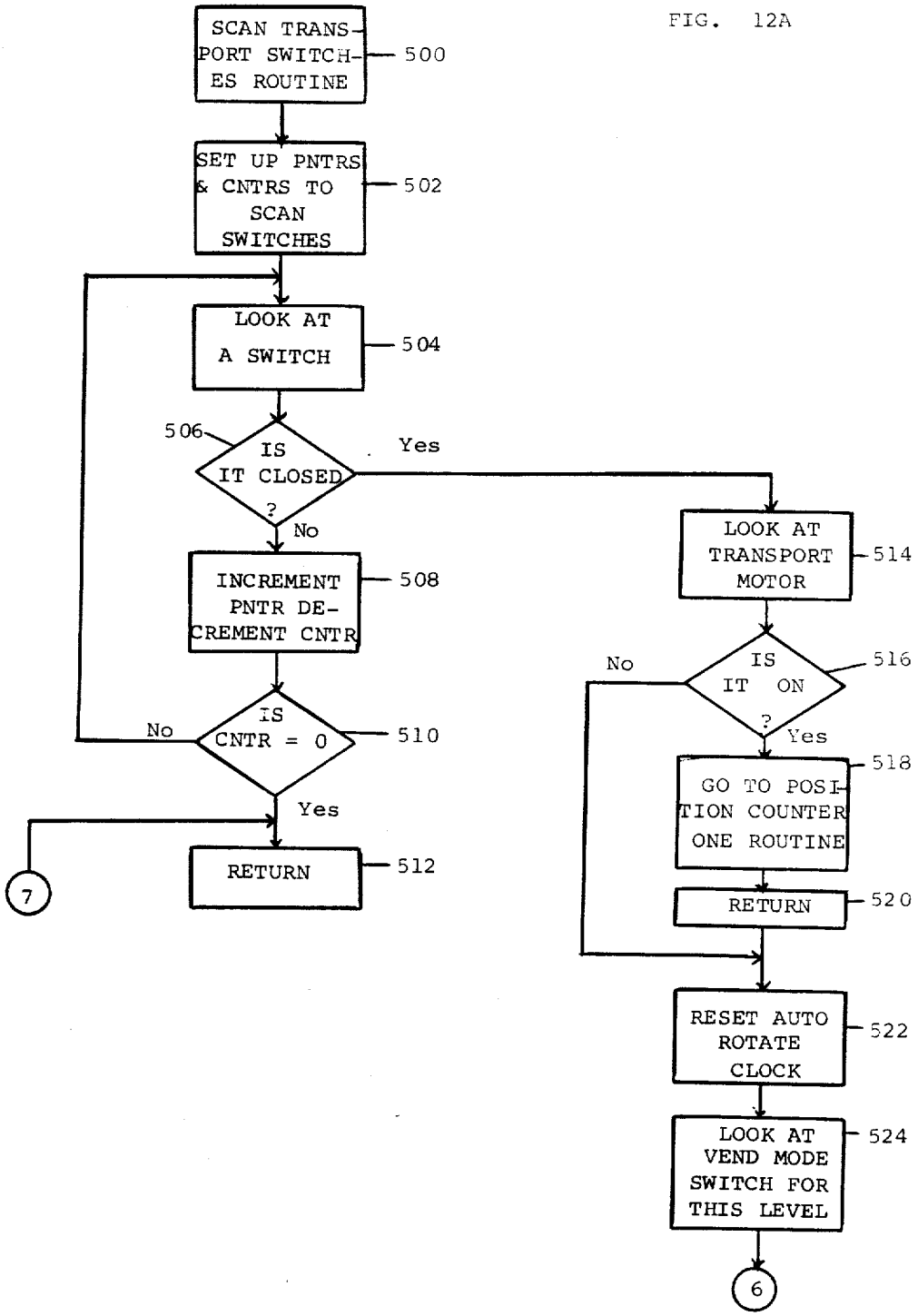
FIG. 12A is a flow chart of the initial portion of the "scan transport switches" subroutine of the main program illustrated in FIGS. 9A to 9C.
Figure 12B:
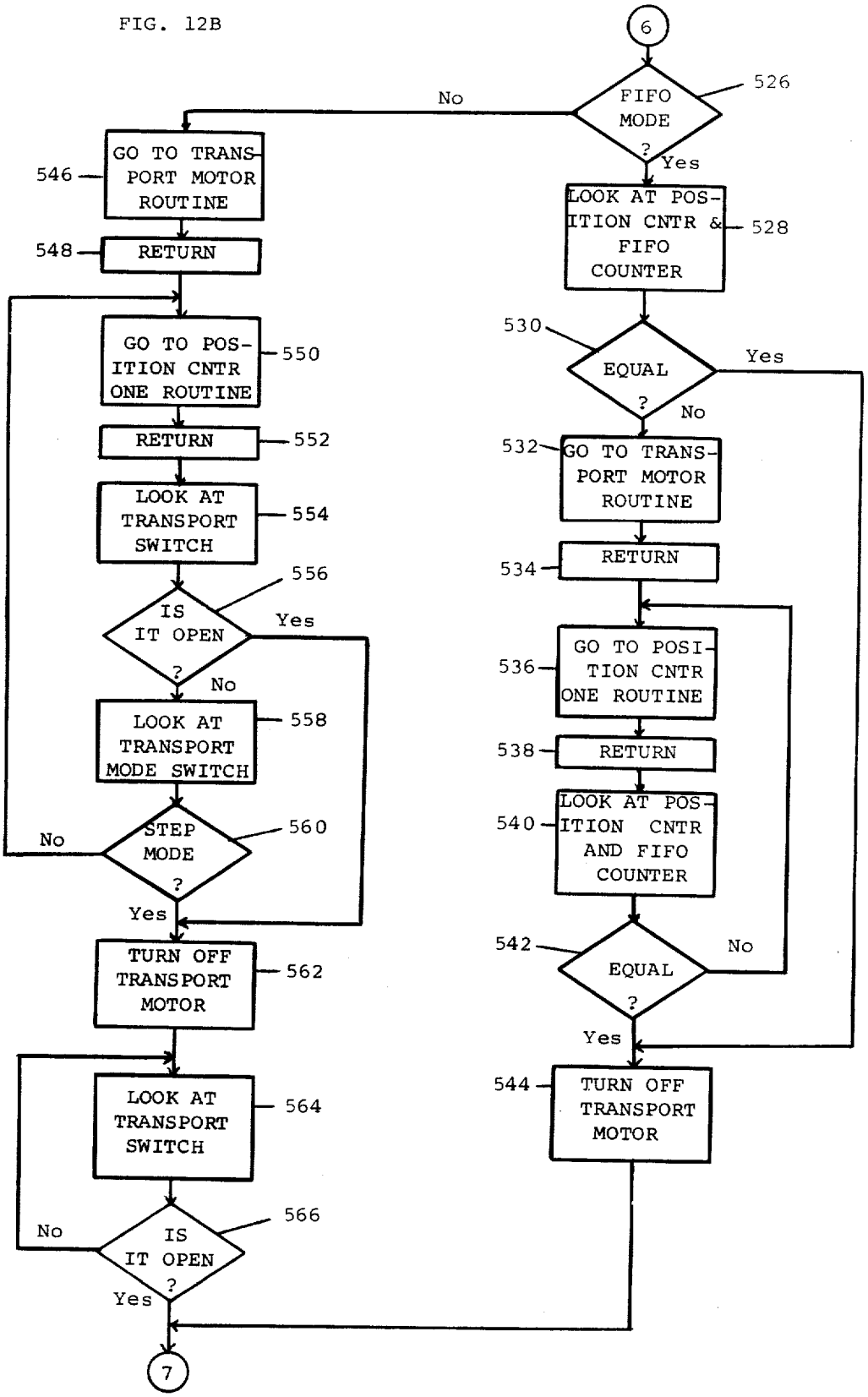
FIG. 12B is a flow chart of the terminal portion of the "scan transport switches" subroutine of the main program illustrated in FIGS. 9A to 9C.

Referring now to FIGS. 12A and 12B, the "scan transport switches" routine, which determines whether one of the eleven transport switches T1 through T11 is actuated, begins at block 500. The loop counter, indicating the number of transport switches which remain to be checked, is set to eleven and a pointer, indicating which switch is to be checked, is set to one (block 502). The program then examines the switch by placing a signal on the line chosen by the pointer (one of the lines 188a to 188k), while scanning input line 142c (blocks 504 and 506). If the signal fails to appear, the loop counter is decremented by one and the pointer is incremented by one (block 508), and the program loops back to block 504 to check the next switch. When the loop counter is decremented to zero, indicating that none of the transport switches are actuated, the program will leave the routine and return (block 510 and 512). If, however, one of the transport switches is actuated, the program will leave the loop formed by blocks 504 through 510 and scan line 146b to determine if the merchandise carrier is rotating (blocks 506, 514 and 516). If the carrier is rotating, the program will wait for the half-cycle switch to close and increment the position counter before re-setting the automatic rotate clock (blocks 518, 520 and 522).

At this point, the corresponding "vend mode switch" V1 through V11 is examined by maintaining the signal on the line chosen by the pointer while scanning line 142a (blocks 524 and 526). If the signal appears, the actuated transport switch is associated with a level set to operate in the first-in, first-out mode and the program will continue through blocks 528 through 544. If the signal fails to appear, the transport switch is associated with the level set to operate in the shopper mode and the program will continue through blocks 546 through 566.

If the level is operating in the FIFO mode, the program will compare the position counter with the FIFO counter for that level, by placing high level signals on lines 146a and 146b, enabling the memory and setting it in the "read" mode, placing the appropriate signals on the memory's address lines 144e to 144h, while scanning the memory's output lines 142a to 142d (blocks 528 and 530). If the counters are equal, indicating that the compartment containing the oldest product on that level is in front of its delivery door, the program will jump to block 544, turn off the transport motor, if it is on, and return (block 512). If the counters are not equal, the transport motor is energized, causing the merchandise carrier to rotate (blocks 532 and 534) and the program enters a loop comprising blocks 536 to 542. The loop increments the position counter each time the half-cycle switch closes and then compares the counters (blocks 536, 538 and 540). The program remains in the loop and the merchandise carrier continues to rotate until the values in the counters are equal, at which point the program exits the loop (block 542), turns off the transport motor (block 544) and returns (block 512).

If, on the other hand, the level is operating in the shopper mode, the program will energize the transport motor (blocks 546 and 548) allow the carrier to move through 1/14th of a revolution (blocks 550 and 552) and then recheck the transport switch (blocks 554 and 556). If the switch is now open, the program will turn off the transport motor (block 562), continue through blocks 564 and 566 and return (block 512). If, however, the switch is still closed, the program will place a signal on line 190b while scanning line 142a to determine whether the machine has been set to operate in the "step transport mode" or in the "continuous transport mode" (blocks 558 and 560). If the transport mode switch is open, the machine has been set to operate in the step mode, and the program will turn off the transport motor (block 562), wait in the loop formed by blocks 564 and 566 until the transport switch is opened and then return (block 512). If the transport mode switch is closed, the machine has been set to operate in the continuous mode, and the program will permit the carrier to rotate as long as the transport switch is closed (blocks 550 through 560). Once the transport switch is opened, the program will turn off the transport motor (blocks 556 and 562), continue through blocks 564 and 566 and return (block 512).

Figure 13A:
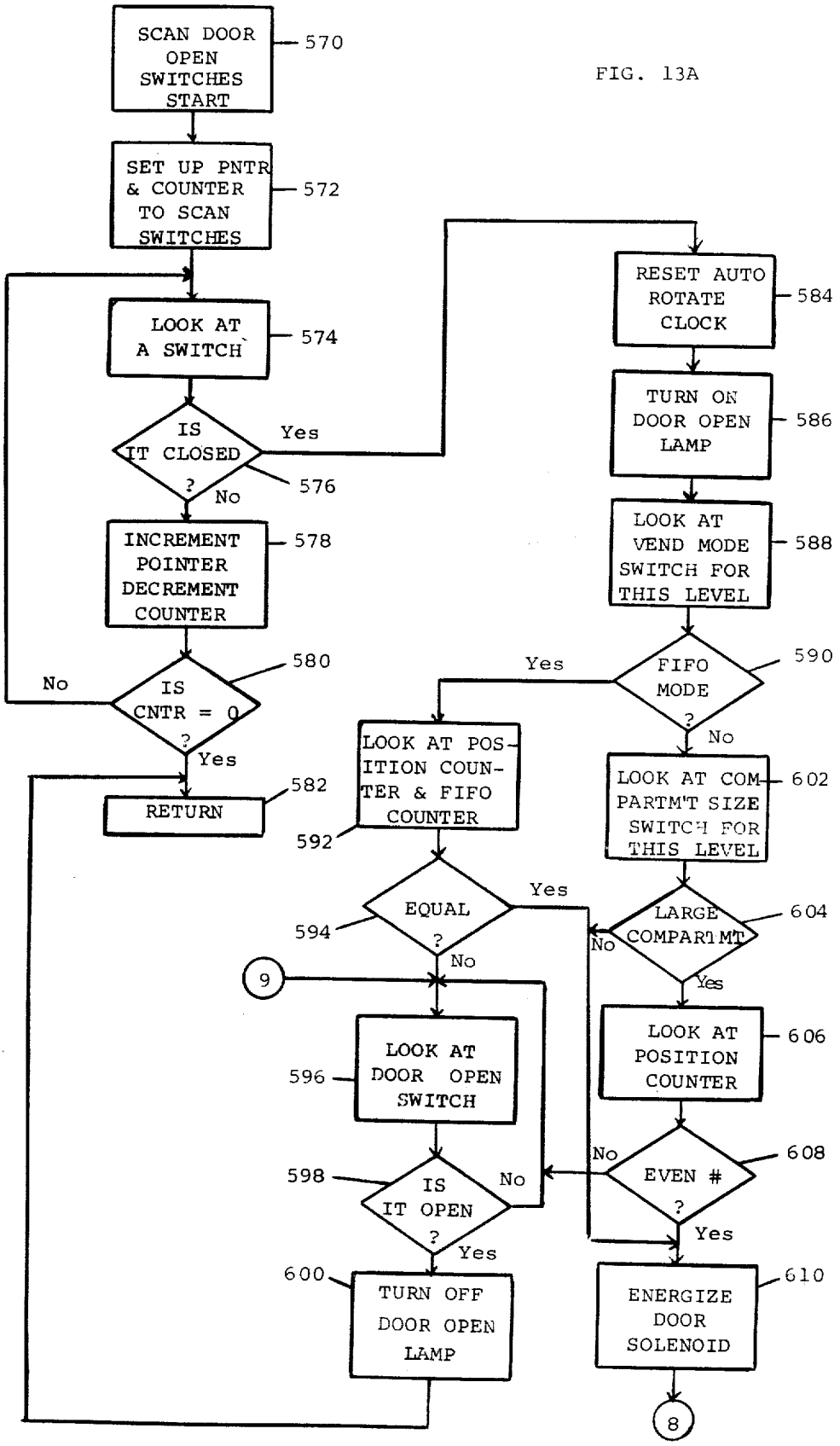
FIG. 13A is a flow chart of the initial portion of the "scan door open switches" subroutine of the main program illustrated in FIGS. 9A to 9C.
Figure 13B:
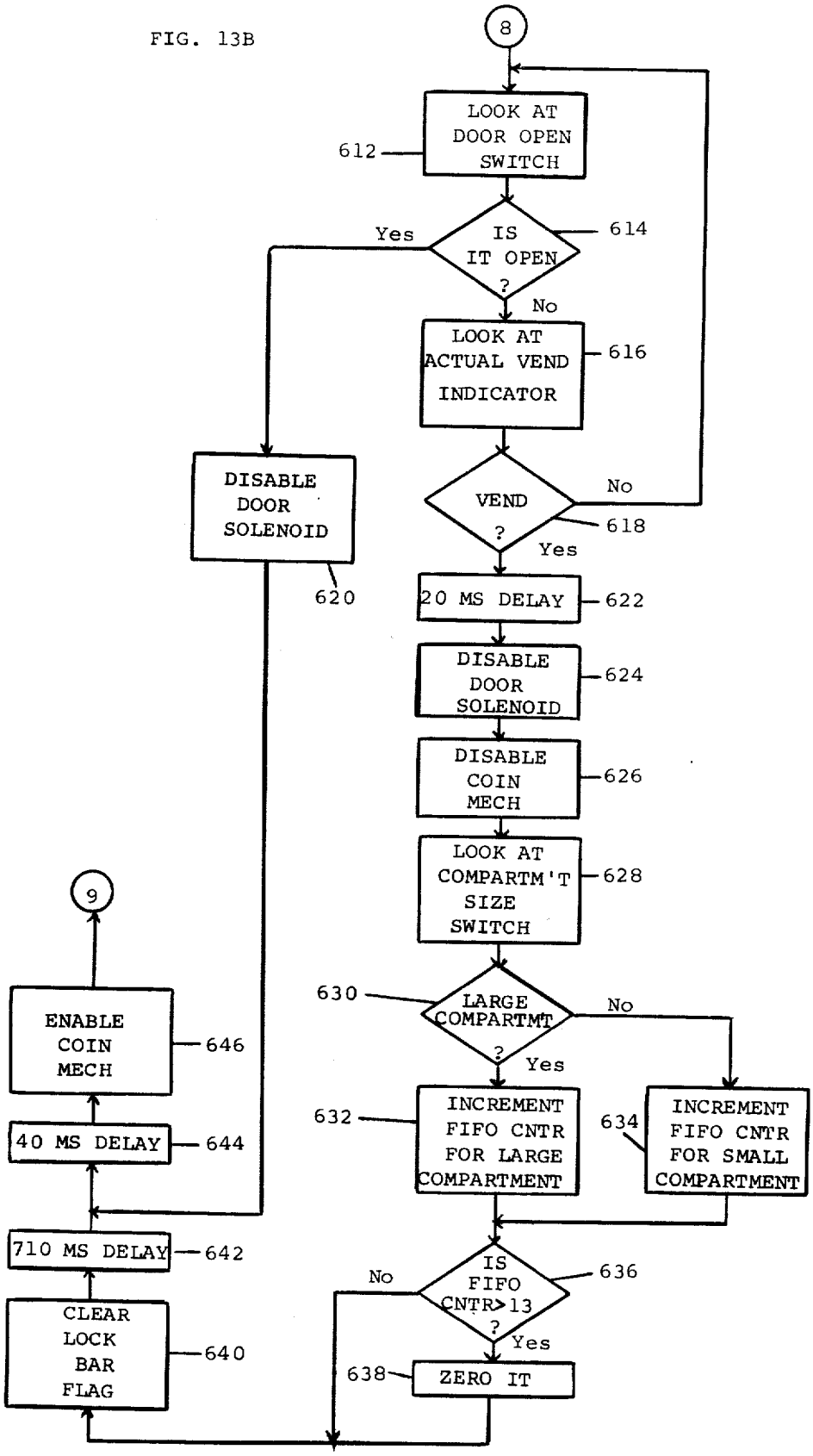
FIG. 13B is a flow chart of the terminal portion of "scan door open switches" subroutine of the main program illustrated in FIGS. 9A to 9C.

Referring now to FIGS. 13A and 13B, the "scan door-open switches" routine, which determines whether one of the eleven door-open switches D1 through D11 is actuated, begins at block 570. Each door-open switch is ganged with a corresponding door solenoid switch S1 through S11 and both are actuated by the partial opening of a delivery door 28a through 28k. A loop counter, indicating a number of door-open switches which remain to be checked, is set to eleven and a pointer, indicating which switch is to be checked, is set to one (block 572). The program then examines a switch by placing a signal on the line chosen by pointer (one of the lines 188a to 188k) while scanning line 142d (blocks 574 and 576). If the signal fails to appear, the loop counter is decremented by one and the pointer is incremented by one, and the program loops back to block 574 to examine the next switch (blocks 578 and 580). When the loop counter has been decremented to zero, indicating that none of the door-open switches is actuated, the program will return (block 582). If, however, one of the door-open switches is actuated, the program will reset the automatic rotate clock (block 548) and place a high level signal on line 146g, illuminating the "door open" lamp (clock 586).

At this point, the corresponding "vend mode switch" V1 through V11 is examined by maintaining the signal on the line chosen by the pointer while scanning line 142a (blocks 588 and 590). If the actuated door open switch is associated with the level set to operate in the first-in, first-out mode, no signal will appear on line 142a and the program will compare the position counter with the FIFO counter for that level (blocks 590 to 594). If they are equal, the program will jump to block 610. If not, the program will wait in a loop until the delivery door is closed, opening the door-open switch (blocks 596 and 598), turn off the door-open lamp by grounding line 146g (block 600) and return (block 582). If the actuated door-open switch is associated with a level set to operate in the shopper mode, the signal will appear on line 142a, and the program will scan line 142d to determine whether the level contains fourteen small compartments, in which case the program will jump to block 610, or seven large compartments (blocks 602 and 604). If the level contains seven large compartments, the program will examine the position counter (blocks 606 and 608). If the counter contains an even number, indicating that a large compartment is properly aligned with its delivery door, the program continues to block 610. If not, the program will wait in a loop for the delivery door to be closed (blocks 596 and 598) before turning off the door open lamp (block 600) and returning (block 582).

As indicated by block 610, the program, by placing a high-level signal on line 146c, supplies power to the actuated door open switch D1 to D11 and to the door solenoid switch S1 to S11 with which the actuated switch D1 to D11 is ganged. If proper coinage was deposited in the machine, the coin mechanism will complete the circuit energizing the corresponding solenoid, one of the solenoids 126a to 126k, which unlocks the associated delivery door, one of the doors 28a to 28k permitting a vend.

If the door open switch is still closed, the program scans line 148 to determine whether a vend was actually made (blocks 612, 614, 616 and 618). If line 148 carries a high-level signal, the delivery door solenoid was not energized and a vend was not made, which may, for example, be the result of the deposit of insufficient coinage. The program will then wait in the loop formed by blocks 612 through 618 until either the delivery door is closed, at which point power will no longer be supplied to the door solenoid switches and the program will jump to block 644, (block 620) or line 148 is grounded, indicating a vend. Once a vend takes place, the program will delay 20 milliseconds before grounding line 146c, turning off the power supply to the door solenoid switches (blocks 622 and 624). The program then places a low-level signal on line 146f, disabling the coin mechanism (block 626) and examines the compartment size switch for the level from which the vend was made (blocks 628 and 630). If the vend was made from a level containing seven large compartments, the FIFO counter for that level is incremented by two (blocks 632). If the level contained fourteen small compartments, the FIFO counter is incremented by one (block 634). This is accomplished by placing a high-level signal on line 146b to enable the memory, placing a low-level signal on line 146a to set the memory in the "write" mode, and placing the appropriate signals on the memory's address lines 144e to 144h and input lines 144a to 144b. A high signal is then placed on line 146a, allowing the program to read the FIFO counter (block 636). If the counter contains a number greater than thirteen, it is set to zero (block 638). The lock-bar flag is then cleared (block 640) and the program delays 710 milliseconds (block 642) before continuing to block 644.

As indicated by block 644, the program further delays 40 milliseconds before placing a high level signal on line 146f, to enable the coin mechanism (block 646). The program then waits for the delivery door to close (blocks 596 and 598) before turning off the door-open lamp (block 600) and returning (block 582).

It will be seen that the objects of the invention have been accomplished. The invention provides an improved control system for an all purpose merchandiser which overcomes the defects of all purpose merchandiser control circuits of the prior art. It permits each individual merchandise level to be operated in either of "first-in, first-out" or "shopper" mode of operation. It permits of "first-in, first-out" operation of a multi-level merchandiser without requiring individual drives for the respective levels. It is both less expensive and more versatile than are systems of the prior art.

It will be understood that certain features and subcombinations are of utility and may be employed without reference to other features and subcombinations. This is contemplated by and is within the scope of the claims. It is further obvious that various changes may be made in details within the scope of the claims without departing from the spirit of my invention. It is, therefore, to be understood that my invention is not to be limited to the specific details shown and described.

Having thus described the invention, what is claimed is:

1. In a merchandising machine, apparatus including a cabinet formed with a plurality of vertically aligned access openings leading into the interior of said cabinet, a plurality of normally locked doors associated with said openings, a merchandise carrier comprising a plurality of levels of compartments each adapted to receive merchandise, means mounting said merchandise carrier for movement as a unit around a vertical axis with said merchandise levels respectively at the heights of said openings, drive means adapted to be energized to move said carrier, a plurality of selecting means corresponding respectively with said levels, respective first control means associated with said selecting means and adapted to be set to energize said drive means in response to actuation of associated selecting means for a period of time to move said carrier to position the next full compartment of the level corresponding to the actuated selecting means behind its associated opening and to stop said carrier in said position, respective second control means associated with said selecting means and adapted to be set to energize said drive means in response to actuation of the associated selecting means to permit the customer stationarily to position any compartment of the corresponding level behind the level opening, means for selectively setting one of said first and second control means of each level to cause the level to operate in a first-in first-out mode or in a shopper mode, and means including said control means and coin responsive means for releasing a door behind which a compartment containing selected merchandise has been positioned.

2. In a merchandising machine, apparatus including a cabinet formed with a plurality of vertically aligned access openings leading into the interior of said cabinet, a plurality of normally locked doors associated with said openings, a merchandise carrier comprising a plurality of levels of compartments each adapted to receive merchandise, means mounting said merchandise carrier for movement as a unit around a vertical axis with said merchandise levels respectively at the heights of said openings, drive means adapted to be energized to move said carrier, a plurality of selecting means associated respectively with said levels, means responsive to actuation of said selecting means associated with one of said levels for energizing said drive means successively to position and stop the compartments of the one level behind the corresponding opening only in a predetermined order, means responsive to actuation of said selecting means associated with another of said levels for energizing said drive means selectively to position and stop the compartments of the other level behind the corresponding opening, and means responsive to the deposit of money in said machine for releasing the door at said associated opening.

3. In a merchandising machine, apparatus including a cabinet formed with a plurality of access openings leading into the interior of said cabinet, respective normally locked doors closing and said openings, a merchandise carrier comprising a plurality of groups of compartments each adapted to receive merchandise, said groups of compartments associated respectively with said openings, means mounting said merchandise carrier in said cabinet for movement as a unit to move the compartments of each group past their associated opening, drive means adapted to be energized to move said carrier means to position the compartments of said groups adjacent to their respective openings, respective customer-enabled and operated means for releasing said doors to permit access to merchandise in a compartment adjacent to a selected door opening, respective selecting means associated with said groups of compartments, respective first control means associated with said groups adapted to be set to permit actuation of the corresponding customer-enabled and operated means upon operation of said drive means to position the compartments of the corresponding groups adjacent to the associated opening at random, respective second control means associated with said groups adapted to be set to permit actuation of the corresponding customer-enabled and operated means upon operation of said drive means to position the compartments of the corresponding group adjacent to the associated opening only in a predetermined order, and means for selectively setting the control means associated with each of said groups.

4. In a merchandising machine, apparatus including a cabinet formed with a plurality of access openings leading into the interior of said cabinet, respective normally locked doors closing said openings, merchandise carrier means comprising a plurality of groups of compartments each adapted to receive merchandise, said groups of compartments associated respectively with said openings, means mounting said merchandise carrier means in said cabinet for movement of the compartments of each group past their associated opening, drive means adapted to move said carrier means to position the compartments of said groups adjacent to their respective openings, respective customer-enabled and operated means for releasing said doors to permit access to merchandise in a compartment adjacent to a selected door opening, respective first control means associated with said groups adapted to be set to permit actuation of the corresponding customer-enabled and operated means upon operation of said drive means to position [means to position] the compartments of the corresponding groups adjacent to the associated opening at random, respective second control means associated with said groups adapted to be set to permit actuation of the corresponding customer-enabled and operated means upon operation of said drive means to position the compartments of the corresponding group from a zero position of the group in sequence adjacent to the associated opening, and means for selectively setting the control means associated with each of said groups.

5. In a merchandising machine, apparatus including a cabinet formed with a plurality of access openings leading into the interior of said cabinet, respective normally locked doors closing said openings, merchandise carrier means comprising a plurality of groups of compartments each adapted to receive merchandise, said groups of compartments associated respectively with said openings, means mounting said merchandise carrier means in said cabinet for movement of the compartments of each group past their associated opening, drive means adapted to move said carrier means to position the compartments of said groups adjacent to their respective openings, respective customer-enabled and operated means for releasing said doors to permit access to merchandise in a compartment adjacent to a selected door opening, respective first control means associated with said groups adapted to be set to permit actuation of the corresponding customer-enabled and operated means upon operation of said drive means to position the compartments of the corresponding groups adjacent to the associated opening at random, respective second control means associated with said groups adapted to be set to permit actuation of the corresponding customer-enabled and operated means upon operation of said drive means to position the compartments of the corresponding group adjacent to the associated opening only in a predetermined order, and means for selectively setting the control means associated with each of said groups.

6. In a merchandising machine, apparatus including a cabinet formed with a plurality of access openings leading into the interior of said cabinet, a merchandise carrier comprising a plurality of groups of compartments each adapted to receive merchandise, said groups of compartments associated respectively with said openings, means mounting said merchandise carrier within said cabinet for movement as a unit to move the compartments of each group past their associated openings, drive means adapted to be energized to move said carrier, respective selecting means associated with said groups of compartments, and means responsive to actuation of the selecting means corresponding to one group for energizing said drive means successively to position and stop the compartments of the one group behind the associated opening only in a predetermined order, and means responsive to actuation of said selecting means corresponding to another of said levels for energizing said drive means selectively to position and stop the compartments of the other level behind the associated opening.

7. In a merchandising machine, apparatus including a cabinet formed with an access opening leading to the interior of the cabinet, a normally locked door closing said opening, a merchandise carrier having a plurality of compartments adapted to receive articles of merchandise, means mounting said merchandise carrier in said cabinet for movement of said compartments past said opening, drive means adapted to move said carrier to position said compartments adjacent to said opening, customer-enabled means for releasing said door to permit access to an article in a compartment positioned adjacent to said opening, first control means adapted to be set to permit operation of said customer-enabled means upon operation of said drive means to position said compartments adjacent to said opening at random, second control means adapted to be set to permit operation of said said customer-enabled means upon operation of said drive means to position said compartments from a zero position of the group in sequence adjacent said opening, and means for selectively setting said control means.

8. In a merchandising machine, apparatus including a cabinet formed with an access opening leading to the interior of the cabinet, a normally locked door closing said opening, a merchandise carrier having a plurality of compartments adapted to receive articles of merchandise, means mounting said merchandise carrier in said cabinet for movement of said compartments past said opening, drive means adapted to move said carrier to position said compartments adjacent to said opening, customer-enabled means for releasing said door to permit access to an article in a compartment positioned adjacent to said opening, first control means adapted to be set to permit operation of said customer-enabled means upon operation of said drive means to position said compartments adjacent to said opening at random, second control means adapted to be set to permit operation of said customer-enabled means upon operation of said drive means to position said compartments adjacent said opening only in a predetermined order, and means for selectively setting said control means.

*9. In a merchandising machine, apparatus including a cabinet formed with an access opening leading to the interior of the cabinet, a merchandise carrier having a plurality of compartments adapted to receive articles of merchandise, means mounting said merchandise carrier in said cabinet for movement of said compartments past said opening, means for moving said carrier stationarily to position the respective compartments adjacent to said opening, first control means adapted to be set to cause said moving means stationarily to position said compartments adjacent to said opening only in a predetermined order, second control means adapted to be set to permit said moving means stationarily to position said compartments adjacent said opening at random, and means for selectively setting said control means.*

*10. In a merchandising machine, apparatus including a cabinet formed with means providing access to the interior of said cabinet, means forming a plurality of groups of compartments adapted to receive articles of merchandise, means mounting said compartment forming means within said cabinet for movement of the compartments of said groups past said access providing means, means for moving said groups of compartments stationarily to position the compartments thereof adjacent said access providing means, respective first control means associated with said groups, each of said first control means adapted to be set to cause said moving means stationarily to position the compartment of the associated group adjacent said access providing means only in a predetermined order, respective second control means associated with said groups, each of said second control means adapted to be set to permit said moving means stationarily to position the compartments of the associated groups adjacent said access providing means at random, and means for selectively setting said control means.*

*11. In a merchandising machine, apparatus including a cabinet formed with a delivery opening, dispensing means including an article storage unit in said cabinet, said storage unit having a plurality of locations at which articles are stored, said dispensing means adapted to be actuated to dispense articles from said locations through said opening, control means adapted to be set selectively in a first condition to cause said articles in said unit to be dispensed in a first-in first-out mode from said locations on successive actuations of said dispensing means and in a second condition to permit said articles in said unit to be dispensed in a random manner from said locations on successive actuations of said dispensing means, and means for setting said control means in said first or second condition.*

12. In a merchandising machine, apparatus including a cabinet formed with means providing access to the interior of the cabinet, a plurality of dispensing means each including an article storage unit in said cabinet, said storage unit having a plurality of locations at which articles are stored, each dispensing means adapted to be actuated to dispense articles from the locations of its storage unit through said access providing means, respective control means associated with said dispensing means, each of said control means adapted to be set selectively in a first condition to cause articles in the corresponding unit to be dispensed in a first-*in first-out mode from the locations of the unit on successive actuations of the corresponding dispensing means and in a second condition to permit articles in the corresponding unit to be dispensed in a random manner from the locations of said unit on successive actuations of the corresponding dispensing means, and means for setting said control means in said first or second condition.*

* * * * *

UNITED STATES PATENT OFFICE
CERTIFICATE OF CORRECTION

Patent No. Re.32,191 Dated June 24, 1986

Inventor(s) MERRILL KRAKAUER

It is certified that error appears in the above-identified patent and that said Letters Patent are hereby corrected as shown below:

Column 17, line 55 delete "and"

Column 20, lines 48 to 59 should be in italics

In the Title of the Invention "merchansider" should read --merchandiser--.

Signed and Sealed this

Fourteenth Day of October, 1986

[SEAL]

*Attest:*

DONALD J. QUIGG

*Attesting Officer*

*Commissioner of Patents and Trademarks*